US010508047B2

(12) United States Patent
Pelletier et al.

(10) Patent No.: US 10,508,047 B2
(45) Date of Patent: Dec. 17, 2019

(54) ULTRAVIOLET LIGHT WATER TREATMENT SYSTEM FOR BATHING UNITS

(71) Applicant: GECKO ALLIANCE GROUP INC., Quebec (CA)

(72) Inventors: Martin Pelletier, Quebec (CA); Benoit Laflamme, Quebec (CA)

(73) Assignee: Gecko Alliance Group Inc., Quebec (CA)

( * ) Notice: Subject to any disclaimer, the term of this patent is extended or adjusted under 35 U.S.C. 154(b) by 0 days.

(21) Appl. No.: 15/089,184

(22) Filed: Apr. 1, 2016

(65) Prior Publication Data
US 2017/0283279 A1  Oct. 5, 2017

(51) Int. Cl.
*C02F 1/32* (2006.01)
*C02F 103/42* (2006.01)

(52) U.S. Cl.
CPC .......... *C02F 1/325* (2013.01); *C02F 2103/42* (2013.01); *C02F 2201/322* (2013.01); *C02F 2201/326* (2013.01); *C02F 2303/04* (2013.01)

(58) Field of Classification Search
CPC .............. C02F 1/325; C02F 2201/3223; C02F 2201/326; C02F 2103/42; C02F 2201/3227
See application file for complete search history.

(56) References Cited

U.S. PATENT DOCUMENTS

| 3,182,191 | A |   | 5/1965 | McFarland et al. |   |
|-----------|---|---|--------|------------------|---|
| 3,683,177 | A | * | 8/1972 | Veloz | A61L 2/10 |
|           |   |   |        |       | 250/435 |
| 4,535,247 | A | * | 8/1985 | Kurtz | A61L 2/24 |
|           |   |   |        |       | 250/436 |
| 5,393,419 | A | * | 2/1995 | Tiede | A61L 2/10 |
|           |   |   |        |       | 210/192 |
| 5,471,063 | A |   | 11/1995 | Hayes et al. |   |
| 5,660,719 | A | * | 8/1997 | Kurtz | A61L 2/10 |
|           |   |   |        |       | 210/748.11 |
| 5,942,110 | A |   | 8/1999 | Norris |   |
| 6,570,173 | B1 |   | 5/2003 | Kunkel et al. |   |
| 6,583,422 | B2 | * | 6/2003 | Boehme | C02F 1/325 |
|           |   |   |        |        | 250/432 R |
| 6,620,318 | B1 | * | 9/2003 | Neofotistos | C02F 1/325 |
|           |   |   |        |             | 210/192 |

(Continued)

FOREIGN PATENT DOCUMENTS

| CA | 2894404 | 6/2014 |
| EP | 1025048 | 8/2000 |

(Continued)

OTHER PUBLICATIONS

Examiner's Report dated Jun. 22, 2017 in connection with Canadian patent application No. 2,925,771, 5 pages.

(Continued)

*Primary Examiner* — Wyatt A Stoffa

(74) *Attorney, Agent, or Firm* — Sheridan Ross P.C.

(57) ABSTRACT

A UV water treatment system comprising a reactor unit for receiving water therein and a power unit for powering the UV water treatment system. The reactor unit includes a housing and a pair of end caps that sealingly engage the housing at opposing ends. Optionally, the UV water treatment system may have a reduced footprint.

43 Claims, 19 Drawing Sheets

(56) References Cited

U.S. PATENT DOCUMENTS

| | | | | |
|---|---|---|---|---|
| 8,591,730 B2* | 11/2013 | Yong | ................ | C02F 1/325 205/428 |
| 9,062,870 B2 | 6/2015 | Hoang | | |
| 9,738,547 B2* | 8/2017 | Schmitt | ................ | A61L 2/10 |
| 2002/0043504 A1* | 4/2002 | Chen | ................ | A61L 2/10 250/455.11 |
| 2004/0036033 A1* | 2/2004 | Snowball | ................ | A61L 2/10 250/431 |
| 2004/0040908 A1* | 3/2004 | Orava | ................ | C02F 3/34 210/620 |
| 2007/0251886 A1* | 11/2007 | Musslin | ................ | C02F 1/325 210/748.11 |
| 2011/0024365 A1* | 2/2011 | Yong | ................ | C02F 1/325 210/748.1 |
| 2012/0051977 A1* | 3/2012 | Boodaghians | ................ | C02F 1/325 422/117 |
| 2012/0138816 A1* | 6/2012 | Duineveld | ................ | C02F 1/325 250/437 |
| 2012/0234166 A1* | 9/2012 | Markham | ................ | A61L 9/20 95/214 |
| 2013/0119266 A1* | 5/2013 | Mondt | ................ | C02F 1/325 250/436 |
| 2013/0320233 A1* | 12/2013 | Anton | ................ | C02F 1/325 250/436 |
| 2014/0158905 A1* | 6/2014 | Hoang | ................ | C02F 1/325 250/435 |
| 2015/0114915 A1* | 4/2015 | Marciano | ................ | B01D 29/908 210/788 |
| 2015/0129776 A1* | 5/2015 | Boodaghians | ................ | C02F 1/325 250/432 R |
| 2016/0052809 A1* | 2/2016 | Kolstad | ................ | C02F 1/32 210/192 |
| 2016/0122208 A1* | 5/2016 | Denkewicz | ................ | C02F 1/325 210/748.11 |
| 2016/0221840 A1* | 8/2016 | Nimmo | ................ | C02F 1/78 |
| 2016/0326021 A1* | 11/2016 | Schmitt | ................ | A61L 2/10 |
| 2017/0197856 A1* | 7/2017 | Kolstad | ................ | C02F 1/32 |
| 2017/0320754 A1* | 11/2017 | Henderson | ................ | C02F 1/325 |
| 2018/0162749 A1* | 6/2018 | Ryman | ................ | C02F 1/325 |

FOREIGN PATENT DOCUMENTS

| | | |
|---|---|---|
| GB | 2467131 | 7/2010 |
| JP | 3688357 | 8/2005 |
| JP | 4451454 | 4/2010 |
| JP | 4451464 | 4/2010 |

OTHER PUBLICATIONS

Examiners Report dated Feb. 22, 2018 in connection with Canadian Patent Application No. 2,925,771—4 pages.
Examiners Report dated Feb. 4, 2019 in connection with Canadian Pat. No. 2,925,771—4 pages.

* cited by examiner

ULTRAVIOLET LIGHT WATER TREATMENT SYSTEM FOR BATHING UNITS

FIELD OF THE INVENTION

The present invention relates to the field of bathing units, and more specifically, to ultraviolet (UV) water treatment devices for sanitizing water in bathing units such as hot tubs, spa and pools.

BACKGROUND

Bathing units, such as spa systems, are found both in commercial and residential environments. An exemplary spa includes a tub which contains tempered water in which a user can bathe. Due to the temperature of the water and its contact with the person bathing therein, the water may contain germs and bacteria.

Chemical substances can be added to the water in order to sanitize it. However, such chemical substances may cause adverse reactions to the user of the spa and moreover, may not be effective in treating the water.

A more recently implemented method of treating water in spas involves ultraviolet (UV) light radiation. That is, by radiating the water with UV light, some of the germs and bacteria contained in the water can be eliminated. However, conventional UV water treatment systems for use with a spa tend to be relatively large and bulky and therefore are inconvenient as they occupy significant space in the spa. In particular, spas for residential use, which are generally smaller than those intended for commercial use, have a limited footprint and therefore the large size of conventional UV water treatment systems renders such system impractical in such spas.

Furthermore, due to their relatively large size, as well as material and design considerations, UV water treatment systems are often relatively expensive to manufacture.

In light of the above, it can be seen that there is a need in the industry for a UV water treatment system that is able to alleviate, at least in part, the deficiencies associated with the UV water treatment systems.

SUMMARY

In accordance with a broad aspect of the invention, there is provided an ultraviolet (UV) water treatment system for treating water in a bathing unit. The UV water treatment system comprises a reactor unit. The reactor unit comprises a housing, an inlet for receiving water into the housing and an outlet for expelling water out of the housing, and a UV light source disposed within the housing and configured to radiate UV light into the housing. The UV water treatment system also comprises a power unit configured to power the UV light source. The power unit is disposed at an end portion of the reactor unit. The power unit comprises a socket connectedly receiving the UV light source and a ballast connected to the socket.

In accordance with another broad aspect of the invention, there is provided an ultraviolet (UV) water treatment system for treating water. The UV water treatment system comprises a power unit and a reactor unit configured to receive and treat water. The reactor unit comprises a housing comprising a first end and a second end, a first end cap disposed at the first end of the housing and a second end cap disposed at the second end of the housing. The first end cap comprises an inlet for receiving water into the reactor unit. The second end cap comprises an outlet for expelling water out of the reactor unit. The reactor unit further comprises a UV light source disposed within the housing and powered by the power unit. The UV light source is configured to radiate UV light into the housing.

These and other aspects of the present disclosure will now become apparent to those of ordinary skill in the art upon review of the following description of embodiments in conjunction with the accompanying drawings.

BRIEF DESCRIPTION OF DRAWINGS

A detailed description of embodiments of the present disclosure is provided below, by way of example only, with reference to drawings annexed hereto, in which.

Figure 1:
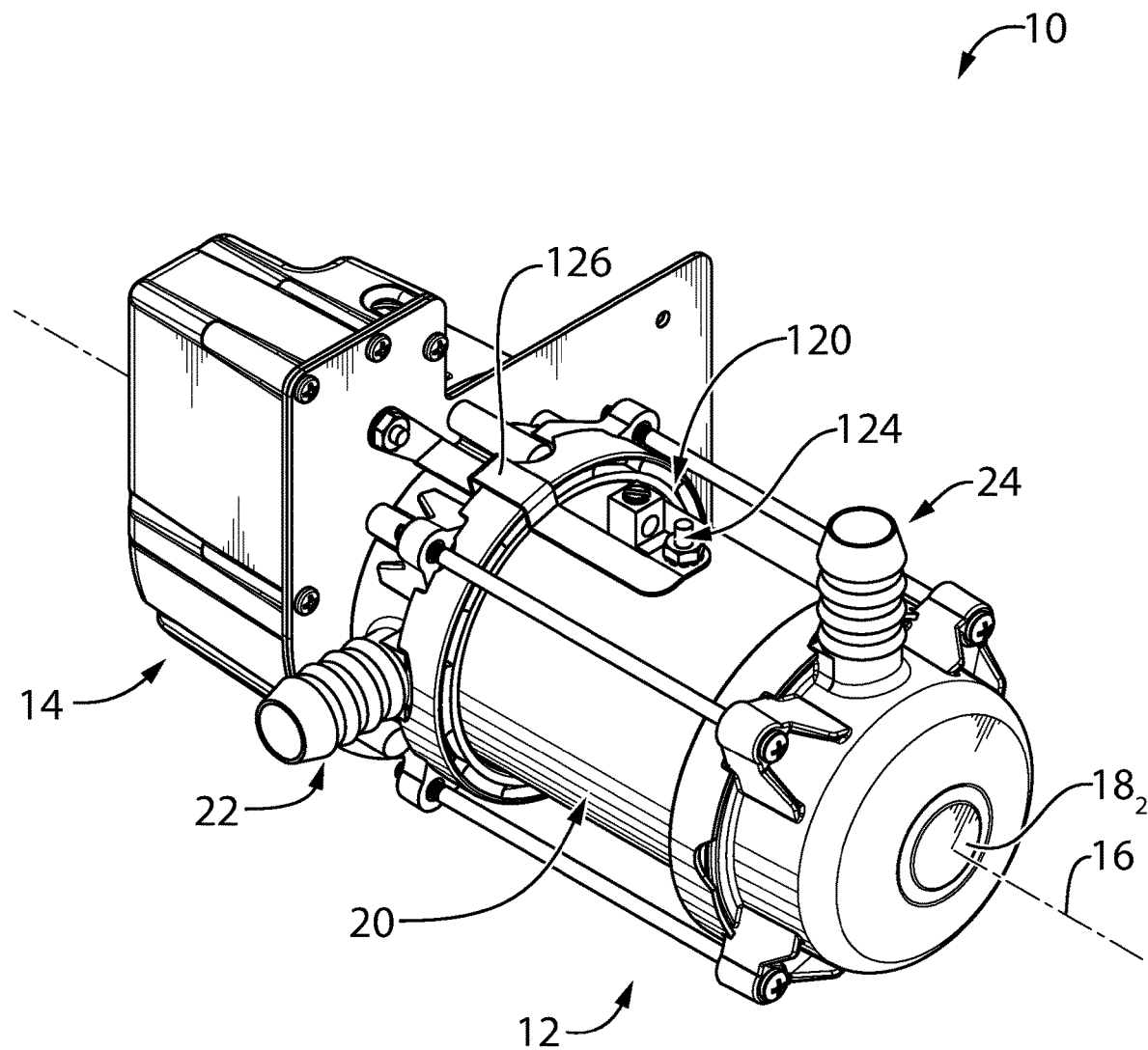
FIGS. 1 and 2 are perspective views of a UV water treatment system in accordance with a specific embodiment of the present invention.
Figure 2:
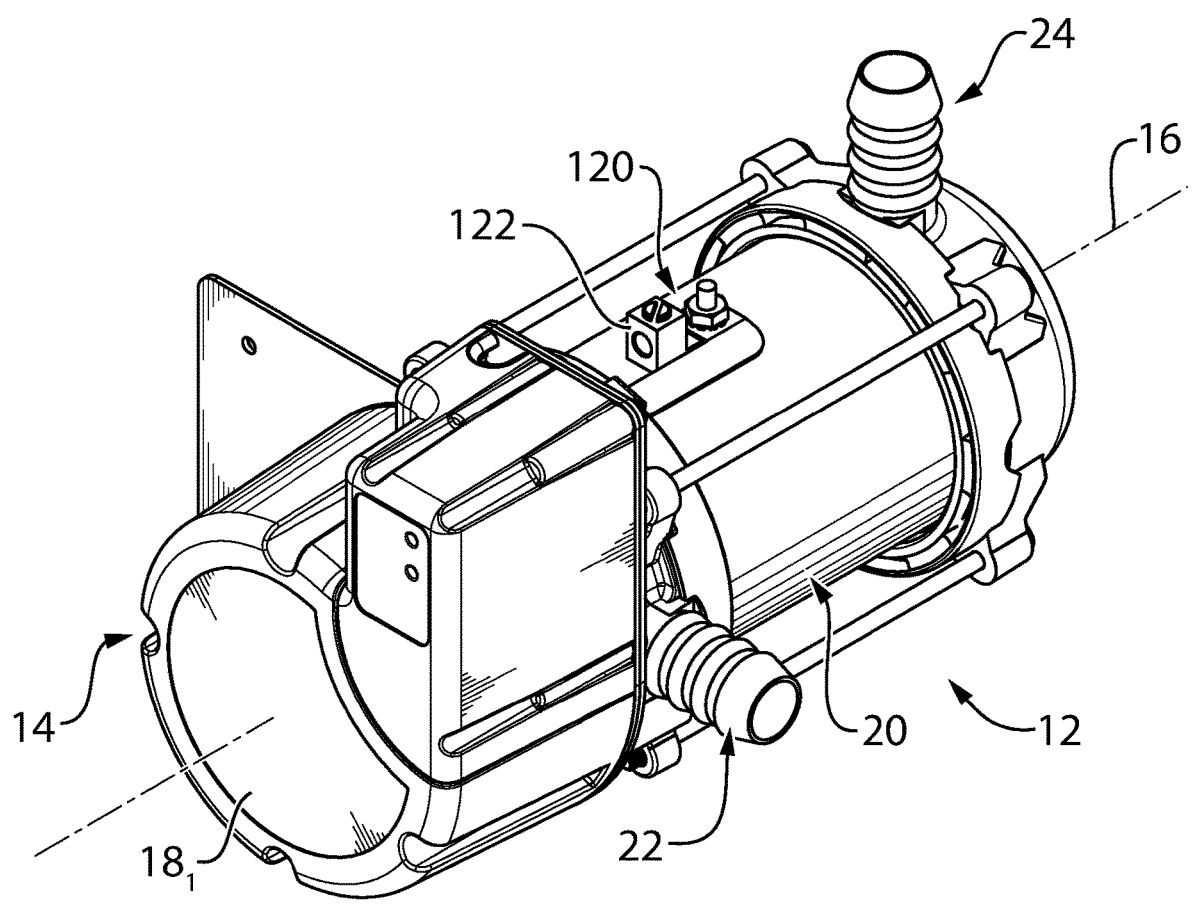
Figure 3:
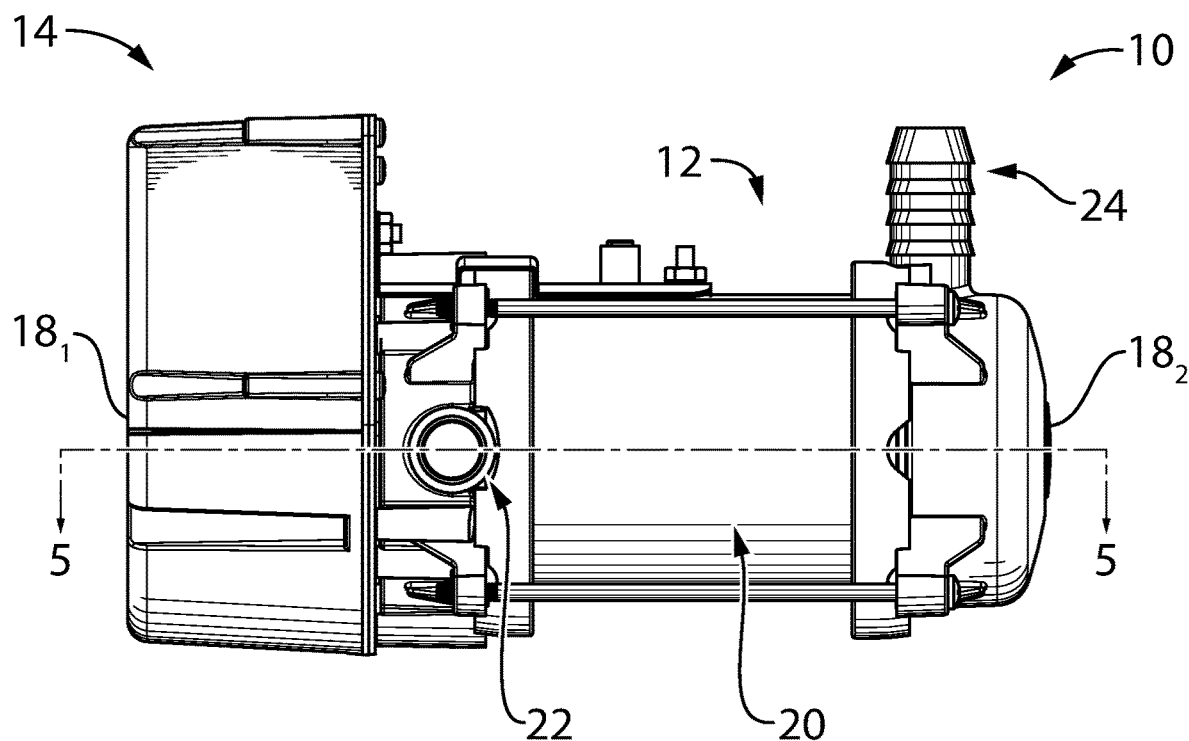
FIG. 3 is a side elevation view of the UV water treatment system shown in FIG. 1.

In the drawings, embodiments of the present disclosure are illustrated by way of example. It is to be expressly understood that the description and drawings are only for purposes of illustration and as an aid to understanding, and are not intended to be a definition of the limits of the invention defined herein.

Other aspects and features of the present invention will become apparent to those ordinarily skilled in the art upon review of the following description of specific embodiments of the invention in conjunction with the accompanying figures.

DETAILED DESCRIPTION OF EMBODIMENTS

The description below is directed to a specific implementation of the invention in the context of a bathing unit system. It is to be understood that the term "bathing unit system", as used for the purposes of the present description, refers to spas, whirlpools, hot tubs, bathtubs, therapeutic baths, swimming pools and any other type of bathing unit that can be equipped with a water sanitization system installed in a water circulation circuit for circulating water to and from a water receptacle (or tub).

FIGS. 1 to 4B show an exemplary embodiment of a UV treatment system 10 designed to be used in a bathing unit system. Notably, as shown and as will be described in more detailed with reference to FIG. 20, the UV treatment system 10 is configured to be mounted at a suitable location in the bathing unit system 100 where water used in the bathing unit system 100 can be circulated through the UV treatment system 10.

The UV treatment system 10 extends along a longitudinal axis 16 from a first (proximal) end $18_1$ to a second (distal) end $18_2$. The UV treatment system 10 comprises a reactor unit 12 for treating water and a power unit 14 for powering the UV treatment system 10. As will be discussed in more detail below, the UV treatment system 10 is used to reduce the quantity of germs and bacteria from water circulated. The configuration of the UV treatment system 10 aims to limit the footprint of the UV treatment system 10 so that it may be accommodated by a smaller space in the bathing unit system 100, such as for example under a spa skirt.

As shown in the figures, the reactor unit 12 comprises a housing 20 in which water is circulated, an inlet 22 for receiving water into the reactor unit 12, an outlet 24 for expelling water from the reactor unit 12 and a UV light source 25 for radiating UV light into an internal space 27 of the reactor unit 12. More particularly, the reactor unit 12 comprises first and second end caps 26, 28 that are mounted to opposing ends of the housing 20. As will be described in more detail below, the reactor unit 12 also comprises a pair of mounting members $32_1$, $32_2$ for sealingly mounting the first and second end caps 26, 28 to the housing 20. In the embodiments shown, the inlet 22 and the outlet 24 of the reactor unit 12 are defined respectively on peripheral edges of the first and second end caps 26, 28. Thus, the inlet and outlet 22, 24 are modularly attached to the housing 20. This "modularity" of the inlet and outlet 22, 24 may allow orienting the inlet 22 and outlet 24 as desired to accommodate other components of the bathing unit system 100. Moreover, it allows easily adapting the capacity of the UV treatment system 10 to have a lesser (or greater) capacity of treating water, notably by using different lengths for the housing 20 and the UV light source 25.

Although not essential to the functioning of the system 10, the UV light source 25 is shown as being disposed substantially centrally within the internal space 27 of the reactor unit 12 and is shown as extending across most of the length of the reactor unit 12. The UV light source 25 comprises a UV light bulb 31 and a casing 33 at least partially enclosing the UV light bulb 31. In this embodiment, the casing 33 is made of quartz to permit a substantial amount of UV light to traverse the casing 33 and reach the internal space 27 of the reactor unit 12. It will be appreciated that, in alternative implementations, the casing 33 may be comprised of other materials with suitable UV light permittivity. The UV light bulb 31 comprises a connecting arrangement 45 (e.g., a plurality of pins) at its proximal end for connecting the UV light bulb 31 to a matching socket in the power unit 14.

In the embodiment depicted, in order to protect the UV light bulb 31 and/or the casing 33, the UV light source 25 comprises cushioning elements $35_1$, $35_2$ mounted at either end of the UV light bulb 31 for absorbing forces between the UV light bulb 31 and other components of the reactor unit 12 (e.g., the casing 33 and/or the proximal end cap 26). To that end, the cushioning elements $35_1$, $35_2$ may comprise a resilient material (e.g., an elastomeric material), a spring or any other suitable mechanism for absorbing shocks and or forces. For example, the elastomeric material of each cushioning element $35_i$ may be rubber.

In the embodiment depicted, the housing 20 of the reactor unit 12 is tubular and defines a generally hollow space 23 in its interior. In this example, the housing 20 is made of a metallic material, such as for example stainless steel (e.g., 316 stainless steel).

Figures 7A, 7B:
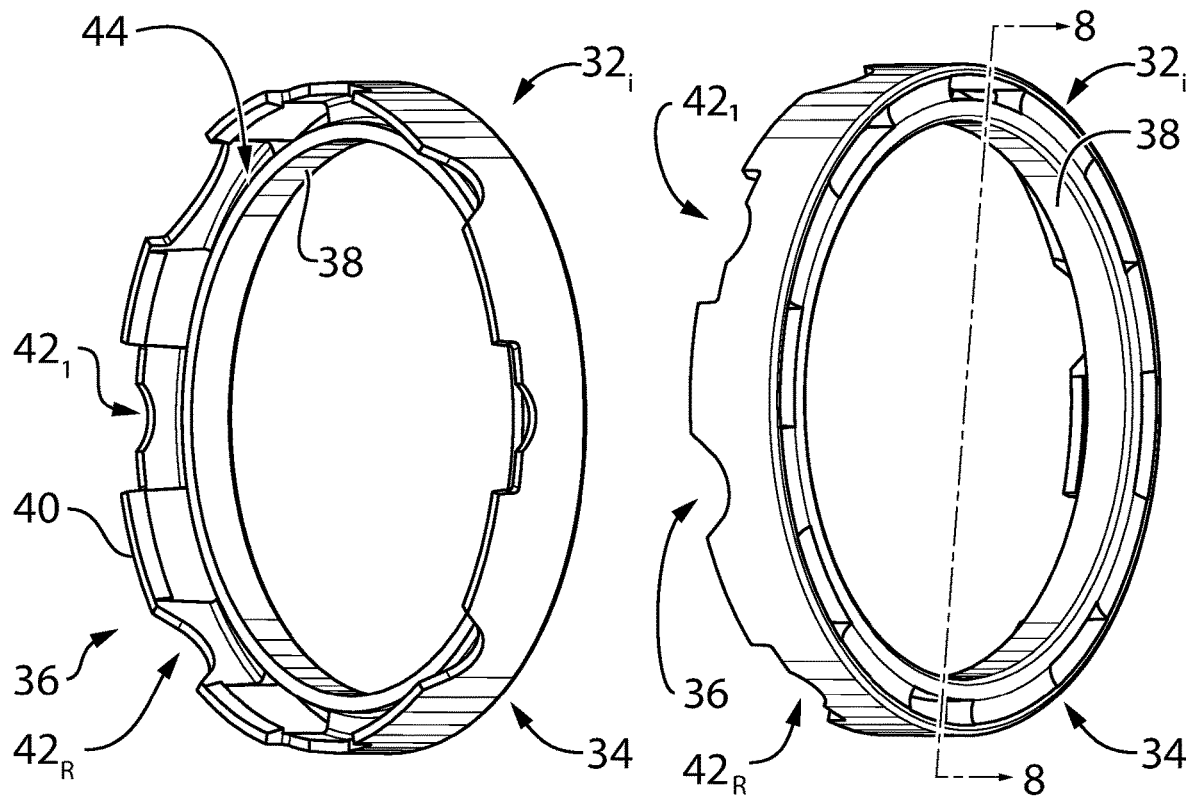
FIGS. 7A and 7B are perspective views of a mounting member of the reactor unit of the UV water treatment system shown in FIG. 1.
Figure 8:
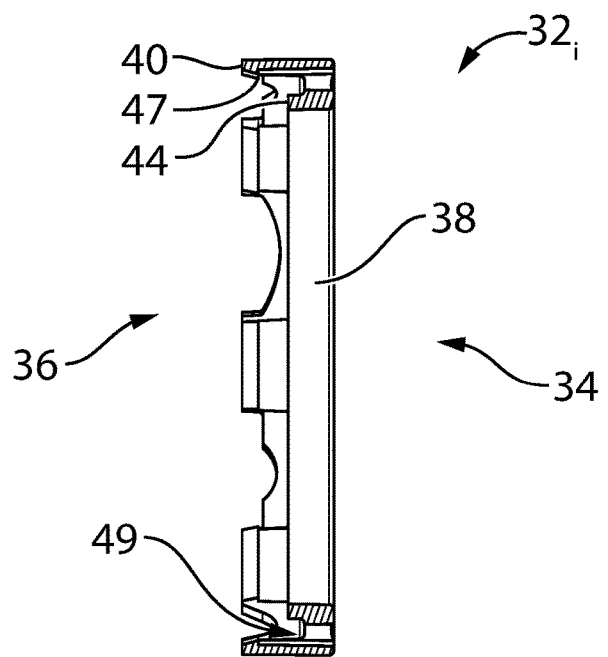
FIG. 8 is a cross-sectional view of the mounting member shown in FIGS. 7A and 7B taken generally along line 8-8 in FIG. 7B.

The mounting members $32_1$, $32_2$ of the reactor unit 12 are configured to sealingly engage a respective one of the first and second end caps 26, 28. As shown in FIGS. 7A, 7B and 8, each mounting member $32_i$ is generally annular, to match the ends of the housing 20, and has an inner side 34 and a cap-engaging outer side 36 opposite the inner side 34. The mounting members $32_i$ each comprise an inner annular surface 38 configured to engage an outer surface of the housing 20, and an outer edge 40 that includes a plurality of recesses $42_1$-$42_R$ for accommodating features of the respective one of the first and second end caps 26, 28. As can best be seen in FIG. 8, the outer edge 40 of the mounting member $32_i$ also includes an inwardly protruding lip 47 for retaining a respective one of the first and second end caps 26, 28. In the embodiment depicted, the protruding lip 47 is interspaced along a periphery of the outer edge 40. The mounting member $32_i$ also comprises an inner shoulder 44 and a cavity 49 in the cap-engaging outer side 36.

In this embodiment, the mounting members $32_i$ are comprised at least in part of a plastic material. In specific practical implementations, the mounting members $32_i$ may be comprised entirely of plastic material.

The second (distal) end cap 28 will now be described with reference to FIGS. 9, 10 and 11.

Figure 9:
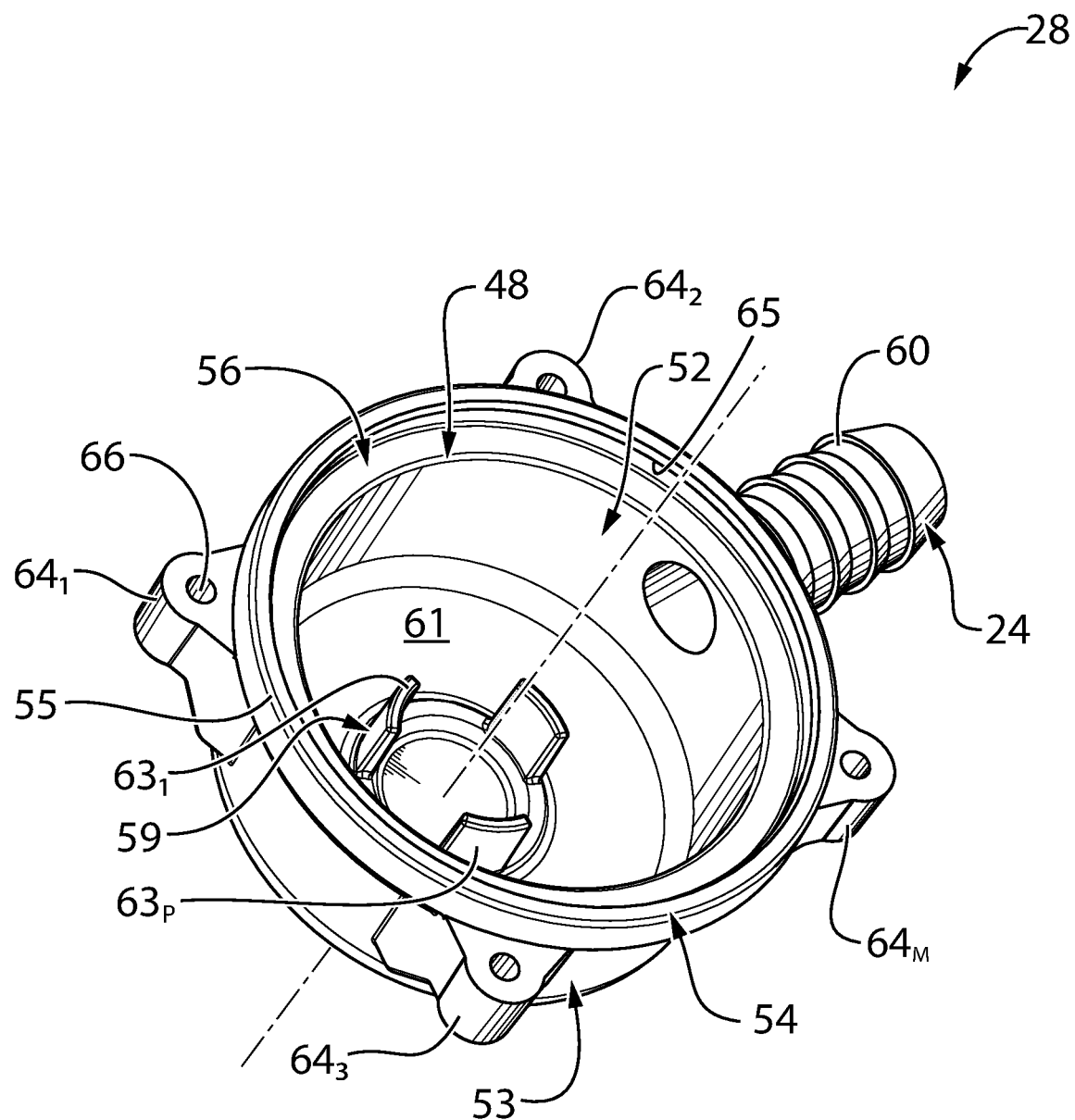
FIGS. 9 and 10 are perspective views of a first end cap of the reactor unit of the UV water treatment system shown in FIG. 1.
Figure 10:
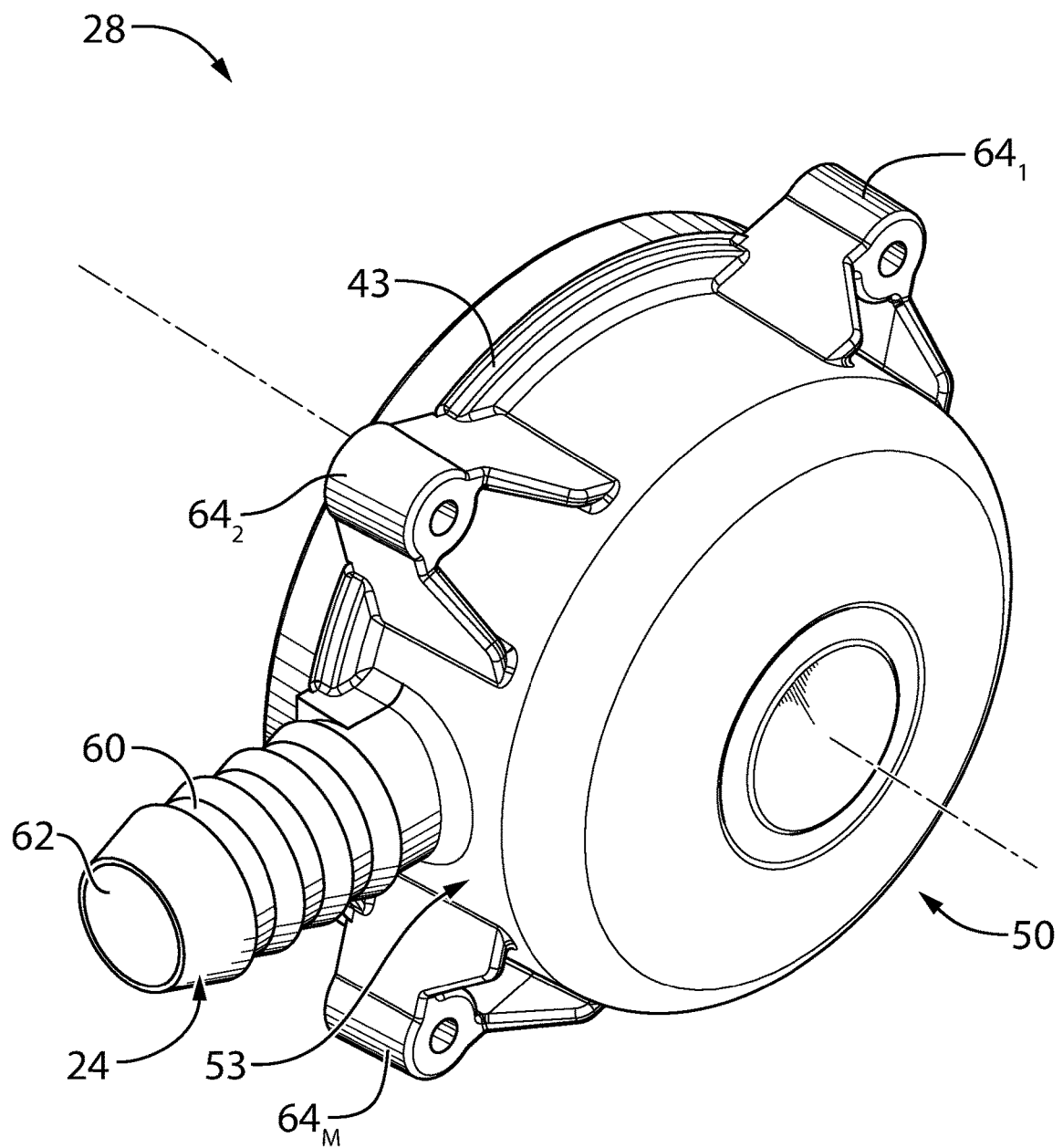

As shown in FIGS. 9 and 10, the second end cap 28 is generally cylindrical and has an inner side 48 for facing the housing 20, an outer side 50 opposite the inner side 48, and a peripheral side 53. The second end cap 28 is configured to be mounted to the housing 20 such that a hollow space 52 of the second end cap 28 is continuous to the hollow space 23 of the housing 20. To that end, the second end cap 28 comprises a rim portion 54 configured to engage the mounting member $32_i$. More particularly, in the embodiment shown, the rim portion 54 comprises an outer edge 55 configured to be received in the cavity 49 of the mounting member $32_1$, and an inner shoulder 56 for abutting an edge of the housing 20. The outer edge 55 comprises an inner peripheral surface 65 that is generally perpendicular to the shoulder 56.

Figure 5:
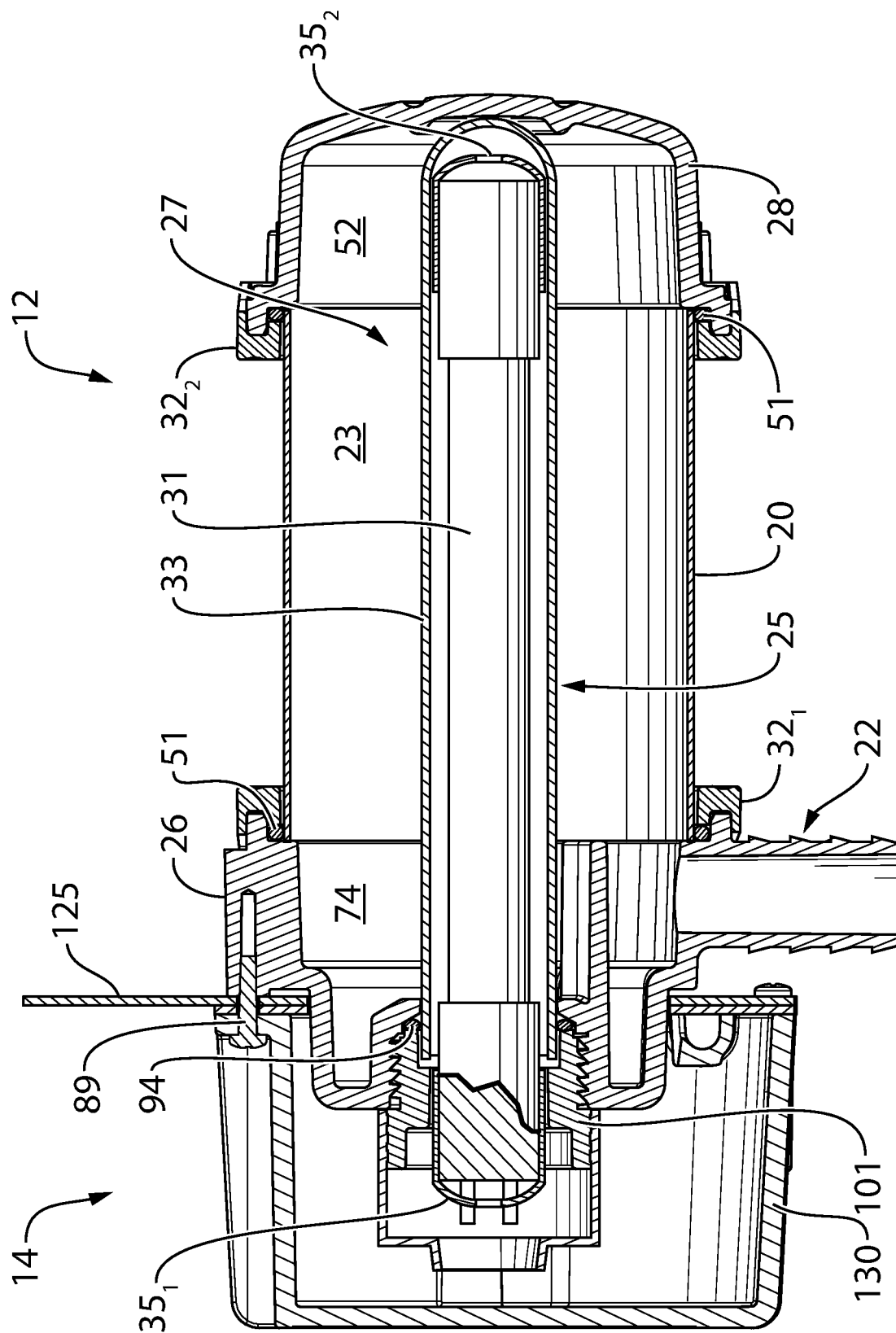
FIG. 5 is a cross-sectional view of the UV water treatment system shown in FIGS. 1, 2, 3, 4A and 4B taken along line 5-5 in FIG. 3.
Figure 6:
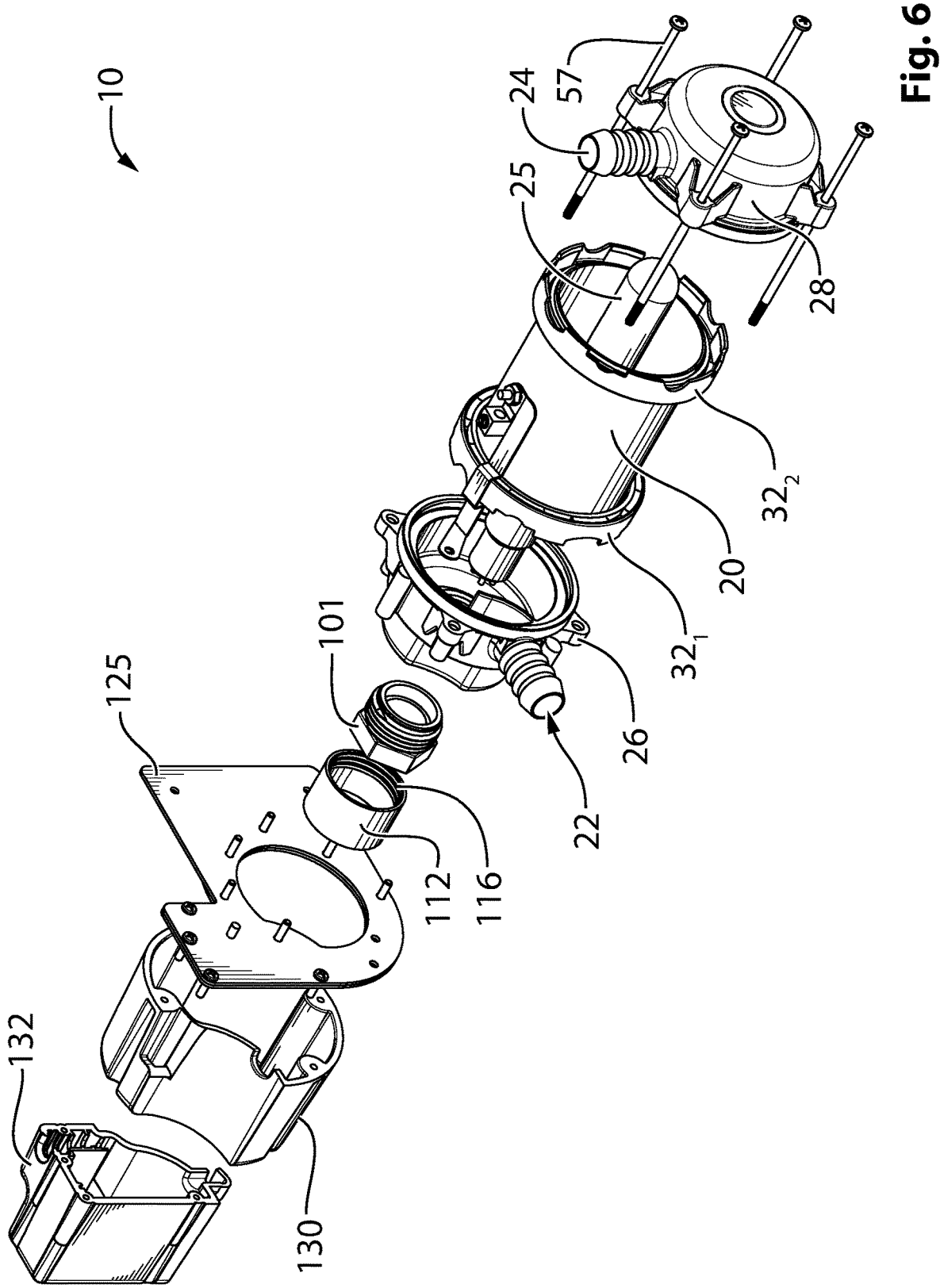
FIG. 6 is an exploded view of the UV water treatment system shown in FIG. 1 showing components of a reactor unit and a power unit of the UV water treatment system.

As can best be seen in FIG. 5, a packing (or sealing) member 51 is disposed between the second end cap 28 and the mounting member $32_i$. More specifically, the packing member 51 is compressed between the inner shoulder 44 of the mounting member $32_i$, the inner shoulder 56 of the second end cap 28, the inner peripheral surface 65 of the outer edge 55, and the outer surface of the housing 20. The packing member 51 aims to provide a water tight seal between the second end cap 28 and the mounting member $32_i$ to prevent leaks from the internal space 27 of the reactor unit 12. The packing (or sealing) member 51 may be an O-ring for example.

The second end cap 28 also comprises a retaining structure 59 on its inner side 48. The retaining structure 59 protrudes from a bottom surface 61 of the second end cap 28 and is configured to retain and/or otherwise limit movement of the UV light source 25 of the reactor unit 12. In this embodiment, the retaining structure 59 comprises a plurality of protrusions $63_1$-$63_P$ that extend along the longitudinal axis 16 of the UV treatment system 10. The protrusions $63_1$-$63_P$ are positioned to form a generally circular arrangement configured to engage and retain the casing 33 of the UV light source 25.

Furthermore, in the embodiment shown, the second end cap 28 comprises a tubular conduit 60 protruding from its peripheral side 53. In this specific example, the tubular conduit 60 constitutes a water outlet 24 for the reactor unit 12. It is to be appreciated that, in alternative implementations, the tubular conduit 60 may instead constitute a water inlet for the reactor unit 12. That is, an opening 62 defined by the tubular conduit 60 leads into the hollow space 52 of the second end cap 28 which, as discussed above, is continuous with the hollow space 23 of the housing 20. The second end cap 28 further comprises a plurality of mounts $64_1$-$64_M$ disposed on its peripheral side 53 and configured for use in securing the second end cap 28 to the remainder of the reactor unit 12. In the embodiment depicted, each mount 64, includes an opening 66 for receiving therein a fastener (e.g., a bolt or other elongated fastener). In this embodiment, the opening 66 is a through hole.

In the embodiment depicted, the second end cap 28 further comprises an annular recess 43 on its peripheral side 53 for engaging the protruding lip 47 of the mounting member $32_i$. It will be appreciated that the recess 43 on the peripheral side 53 may not be annular in other embodiments but may be interspaced along the periphery of the second end cap 28 such as to engage the protruding lip 47 of the mounting member $32_i$. The recess 43 of the second end cap 28 and the protruding lip 47 of the mounting member $32_i$ allows the mounting member $32_i$ to clip onto the second end cap 28 such as to retain the second end cap 28 on the housing 20.

The first (proximal) end cap 26 will now be described with reference to FIGS. 11 and 12.

Figure 11:
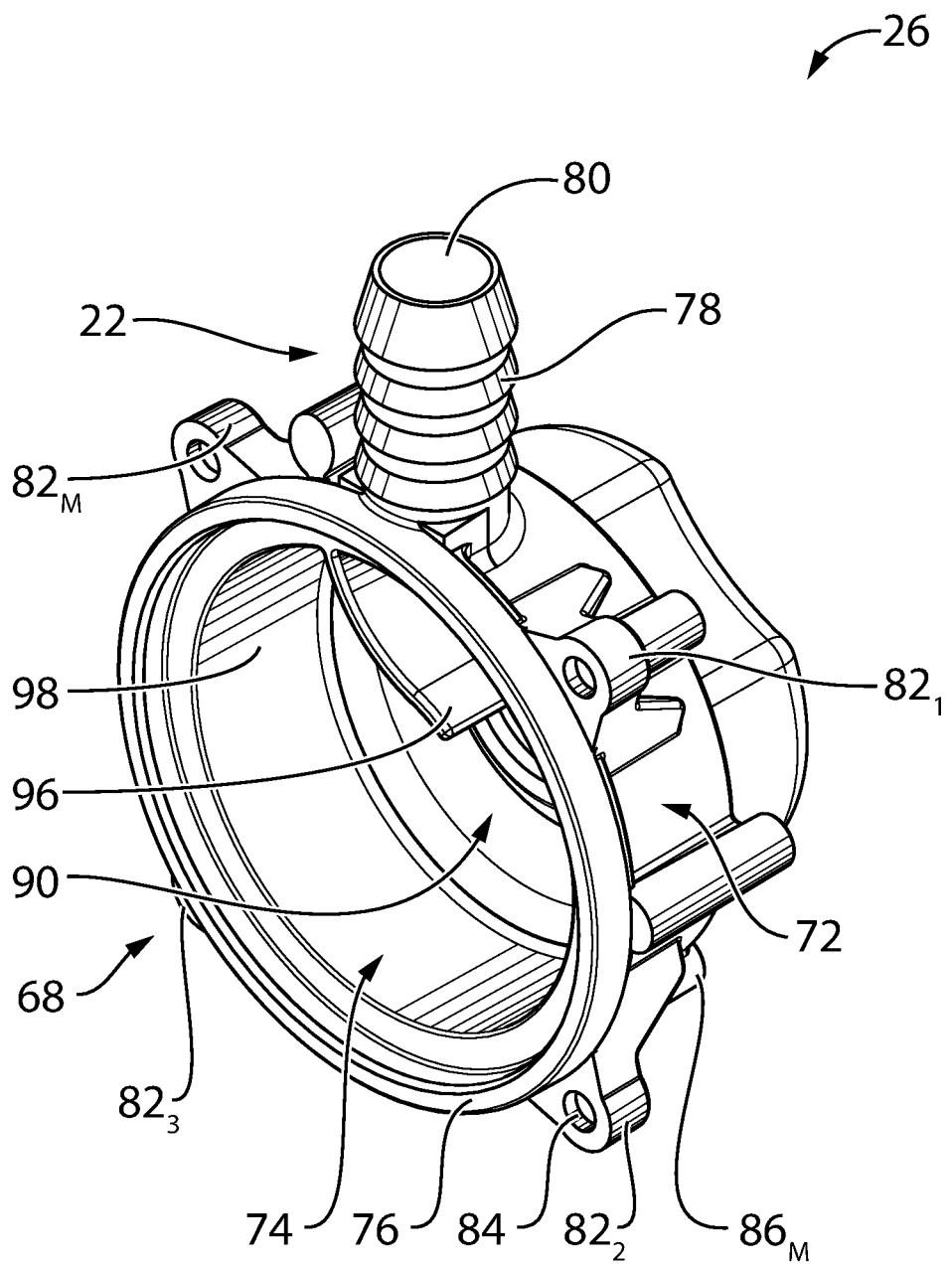
FIGS. 11 and 12 are perspective views of a second end cap of the reactor unit of the UV water treatment system shown in FIG. 1.
Figure 12:
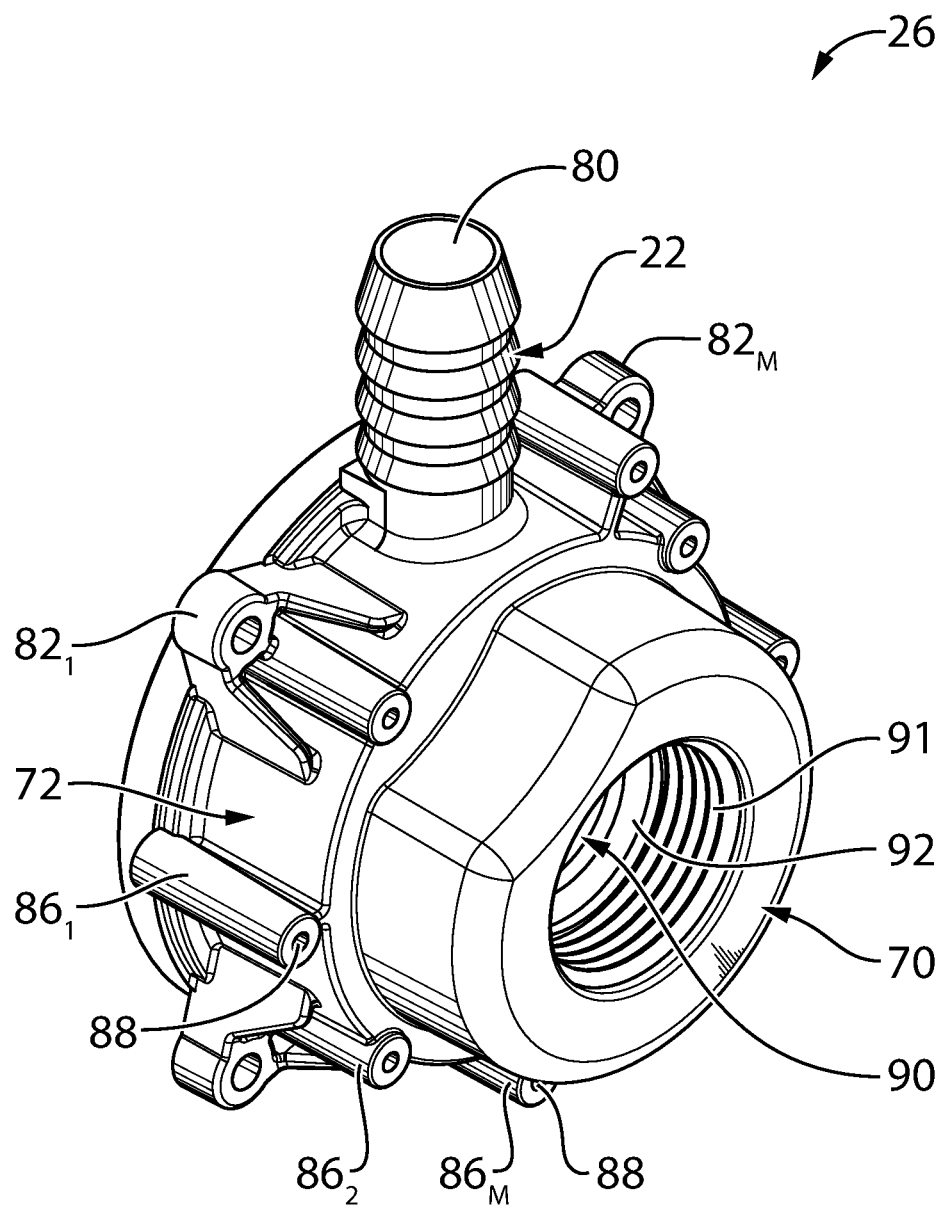
Figure 13A:
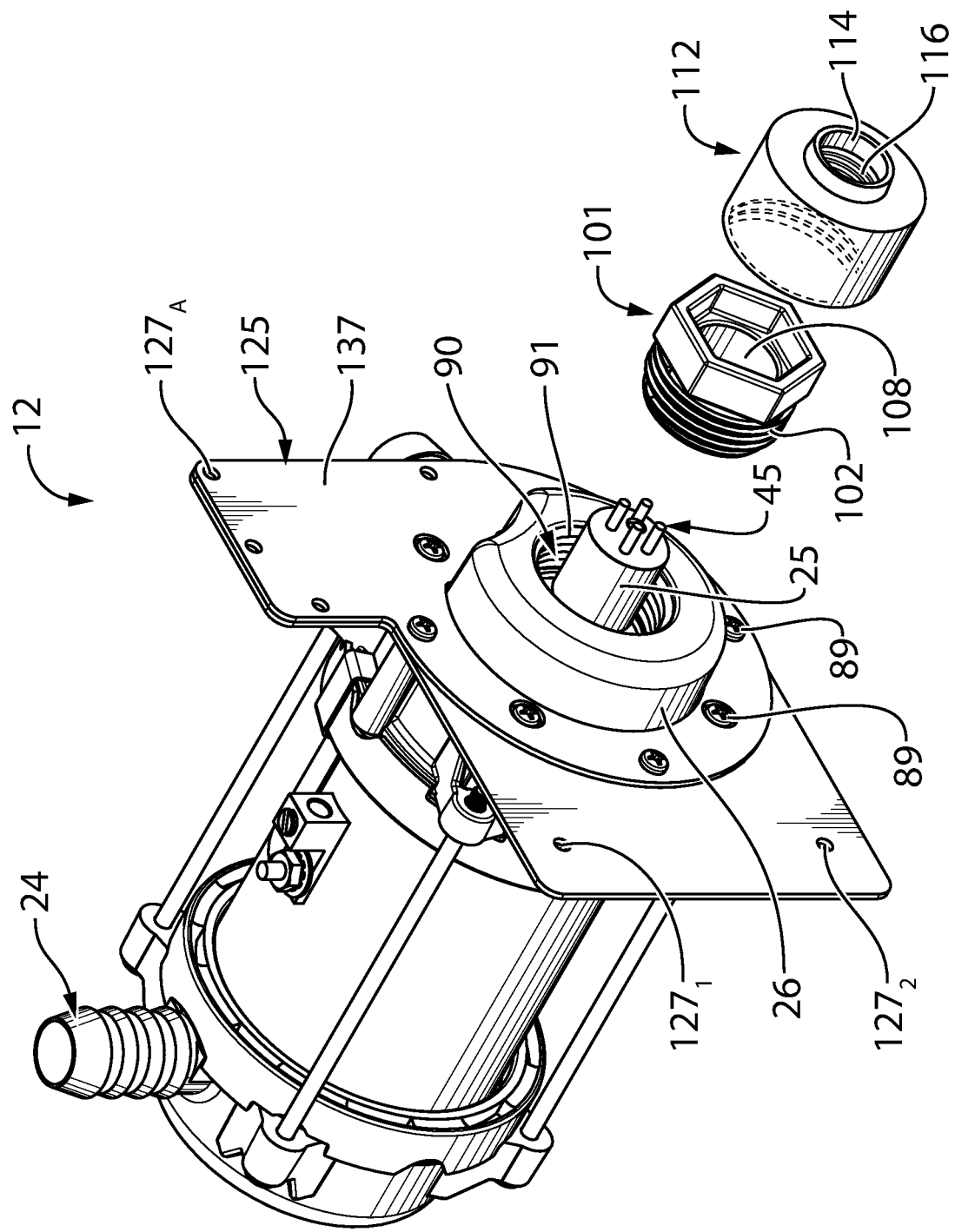
FIG. 13A is a partially exploded view of the reactor unit of the UV water treatment system shown in FIG. 1, showing more particularly a sealing fastener prior to its engagement with the second end cap of the reactor unit.
Figure 13B:
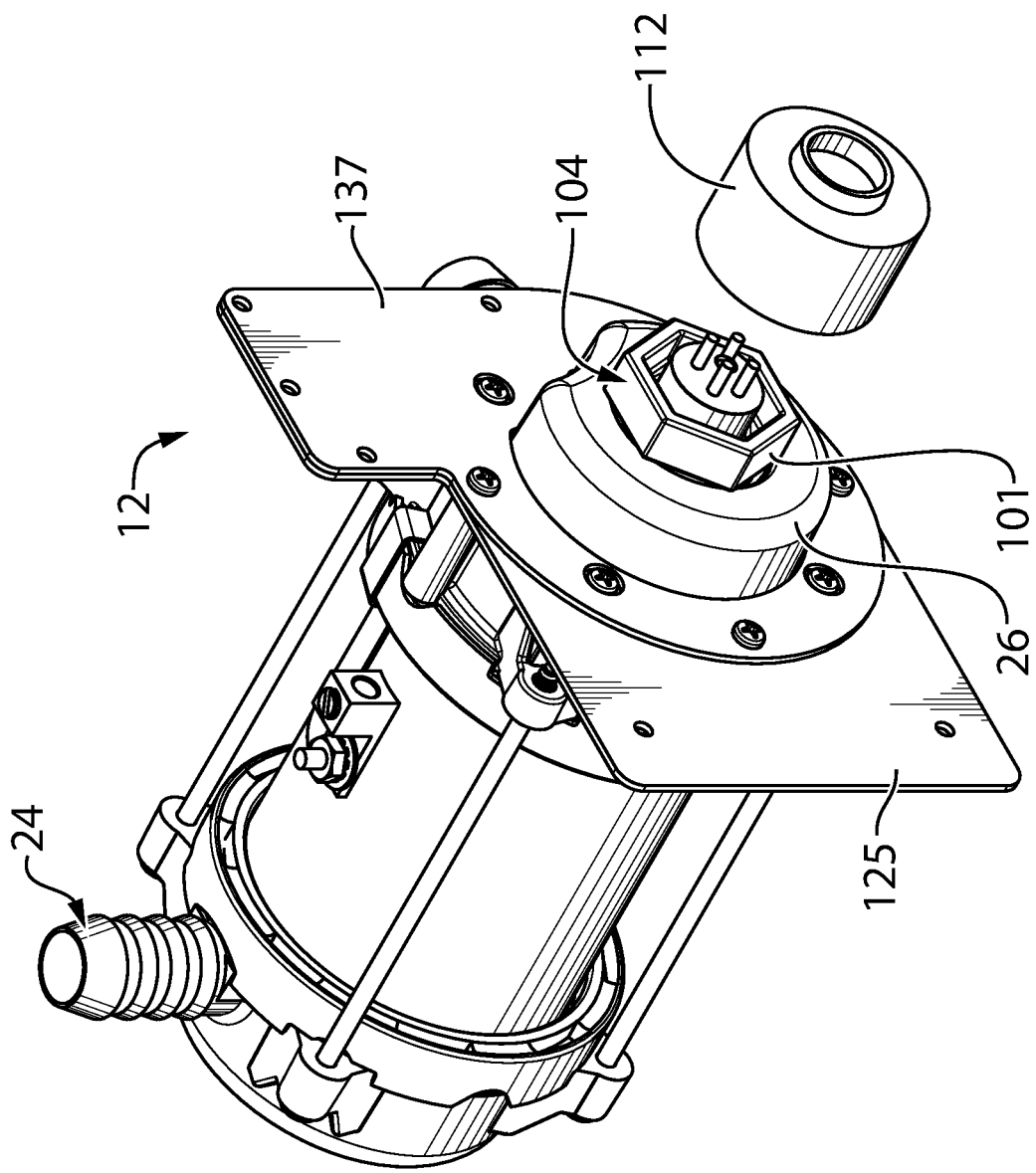
FIG. 13B is a partially exploded view of the reactor unit of the UV water treatment system shown in FIG. 1, showing more particularly a fastener cap prior to its engagement with the sealing fastener at the second end cap of the reactor unit.
Figure 14:
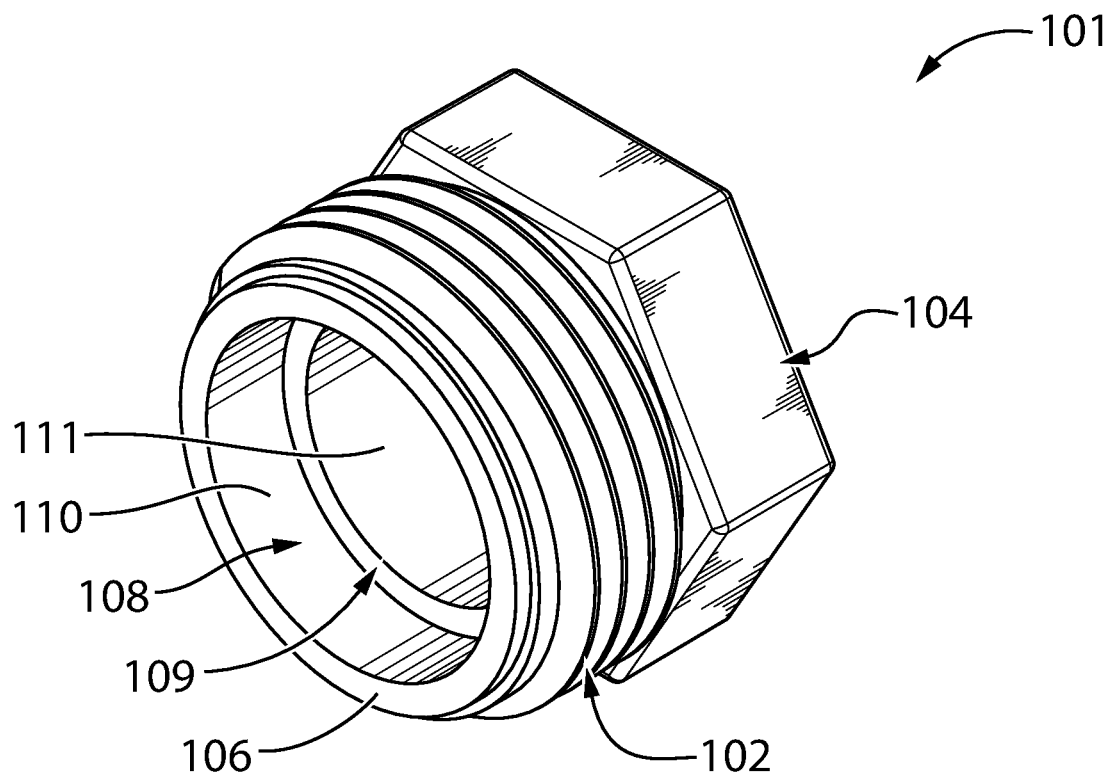
FIGS. 14 and 15 are perspective views of the sealing fastener of the reactor unit at the second end cap of the reactor unit.
Figure 15:
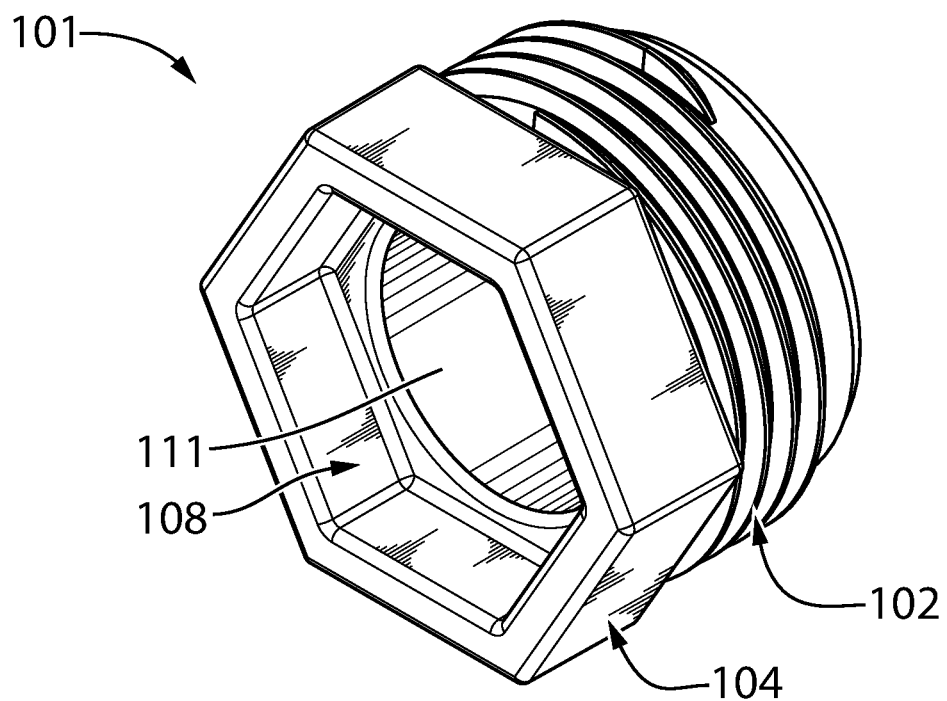
Figure 16:
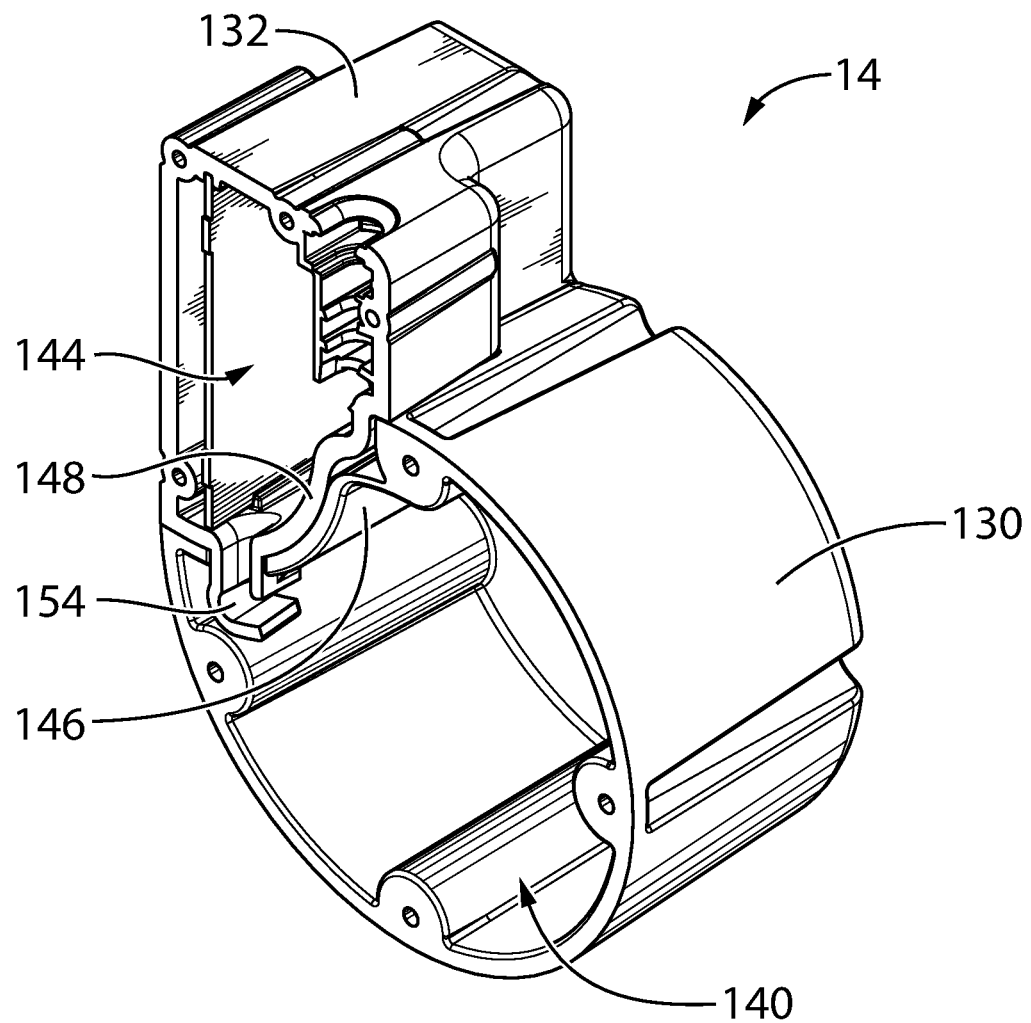
FIGS. 16 and 17 are perspective views of a cover member of the power unit positioned at the first end of the UV water treatment system of FIG. 1, the cover member including first and second cover member components.

As shown in FIGS. 11 and 12, the first end cap 26 is generally cylindrical and has an inner side 68 for facing the housing 20, an outer side 70 opposite the inner side 68, and a peripheral side 72. The first end cap 26 is configured to be mounted to the housing 20 such that a hollow space 74 of the first end cap 26 is continuous to the hollow space 23 of the housing 20 and the hollow space 52 of the second end cap 28. To that end, the first end cap 26 comprises a rim portion 76 that is configured in a manner similar to the rim portion 54 of the second end cap 28 in order to sealingly engage the mounting member $32_i$. Thus, as will be appreciated, the hollow spaces of the first and second end caps 26, 28 and the housing 20 together constitute the internal space 27 of the reactor unit 12.

In the embodiment shown, the first end cap 26 comprises a tubular conduit 78 protruding from its peripheral side 72. In this specific example, the tubular conduit 78 constitutes a water inlet 22 for the reactor unit 12. It is to be appreciated that, in alternative implementations in which the tubular conduit 60 of the second end cap 28 constitutes a water inlet for the reactor unit 12, the tubular conduit 78 of the first end cap 26 may constitute a water outlet for the reactor unit 12.

That is, an opening 80 defined by the tubular conduit 78 leads into the hollow space 74 of the first end cap 26 which, as discussed above, is part of the internal space 27 of the reactor unit 12. Furthermore, in the embodiment depicted, the first end cap 26 comprises a curved inner wall 96 that protrudes from an inner peripheral surface 98 of the first end cap 26 and extends below a lower end of the opening 80 of the tubular conduit 78. When the UV treatment system 10 is assembled and the UV light source 25 is positioned within the reactor unit 12, the curved inner wall 96 helps shield the inlet 22 from UV light radiated by the UV light source 25, thereby reducing the amount of deterioration the inlet 22 and/or tubing connected thereto may be subjected to as a result of such UV exposure.

The first end cap 26 further comprises a plurality of first mounts $82_1$-$82_M$ and a plurality of second mounts $86_1$-$86_M$ disposed on the peripheral side 72 of the end cap 26. The first mounts $82_1$-$82_M$ are configured for securing the first end cap 26 to the remainder of the reactor unit 12 while the second mounts $86_1$-$86_M$ are configured to secure the reactor unit 12 to the power unit 14 and a mounting fixture which will be described in more detail below. Each mount $82_i$ of the first mounts $82_1$-$82_M$ comprises an opening 84 for receiving there through a fastener 57. In particular, in this embodiment, the opening 84 is threaded (or comprises a threaded insert) such that the fastener 57 can threadedly engage the opening 84. Thus, in this embodiment, the fastener 57 extends from the second end cap 28 to the first end cap 26, engaging the openings 66, 84 of each of the mounts $64_i$, $82_i$. Each mount $86_i$ of the second mounts $86_1$-$86_M$ comprises an opening 88 for receiving therein a fastener 89.

The first end cap 26 also comprises an opening 90 extending from the inner side 68 to the outer side 70 and positioned concentrically with the cylindrical shape of the first end cap 26. The opening 90 comprises a thread 91 for engaging a fastener and a shoulder 92 facing the outer side 70 and configured to receive a packing (or sealing) member 94 (best seen in FIG. 5). The packing (or sealing) member 94 may be an O-ring for example. The opening 90 is configured for allowing the UV light source 25 to be slid into the housing 20 through the first end cap 26.

In this embodiment, the first and second end caps 26, 28 are manufactured using a plastic material. In practical implementation, the plastic material of the first and second end caps 26, 28 would preferably be selected to have some resistance to UV light exposure.

Advantageously, positioning the water inlet and outlet with the first and second end caps 26 28 of the type described above, eliminates the need to provide a water inlet and outlet that would need to be welded to the housing 20. The reduced use of welding in the manufacturing of the UV treatment system 10 may reduce the risk of leaks in the reactor unit 12 that may otherwise occur in welded joints.

Figure 4A:
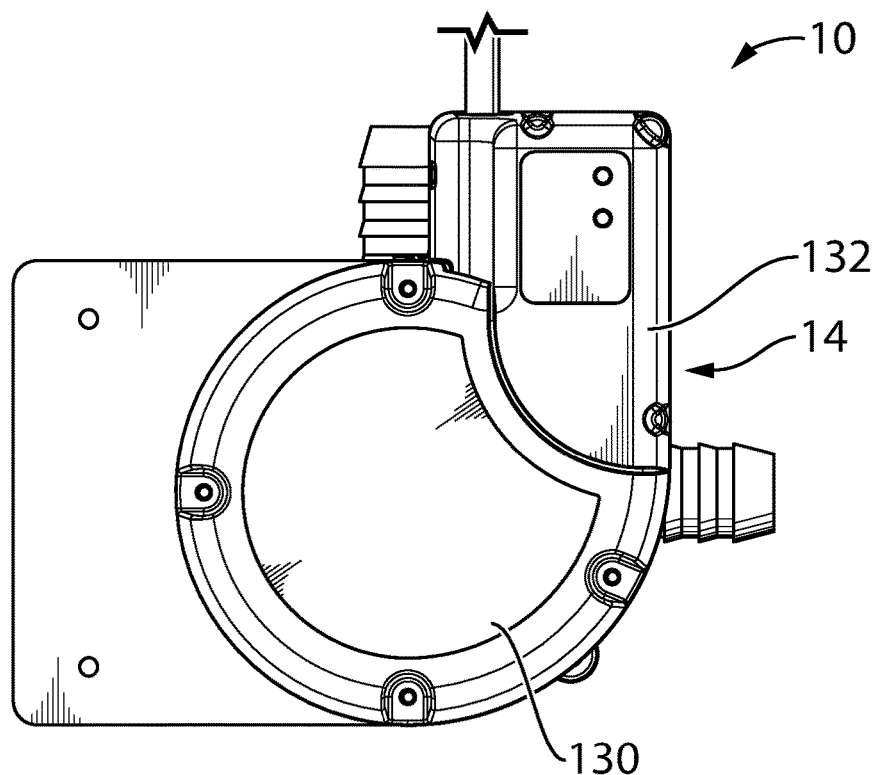
FIGS. 4A and 4B are respective rear and front elevation views of the UV water treatment system shown in FIG. 1.
Figure 4B:
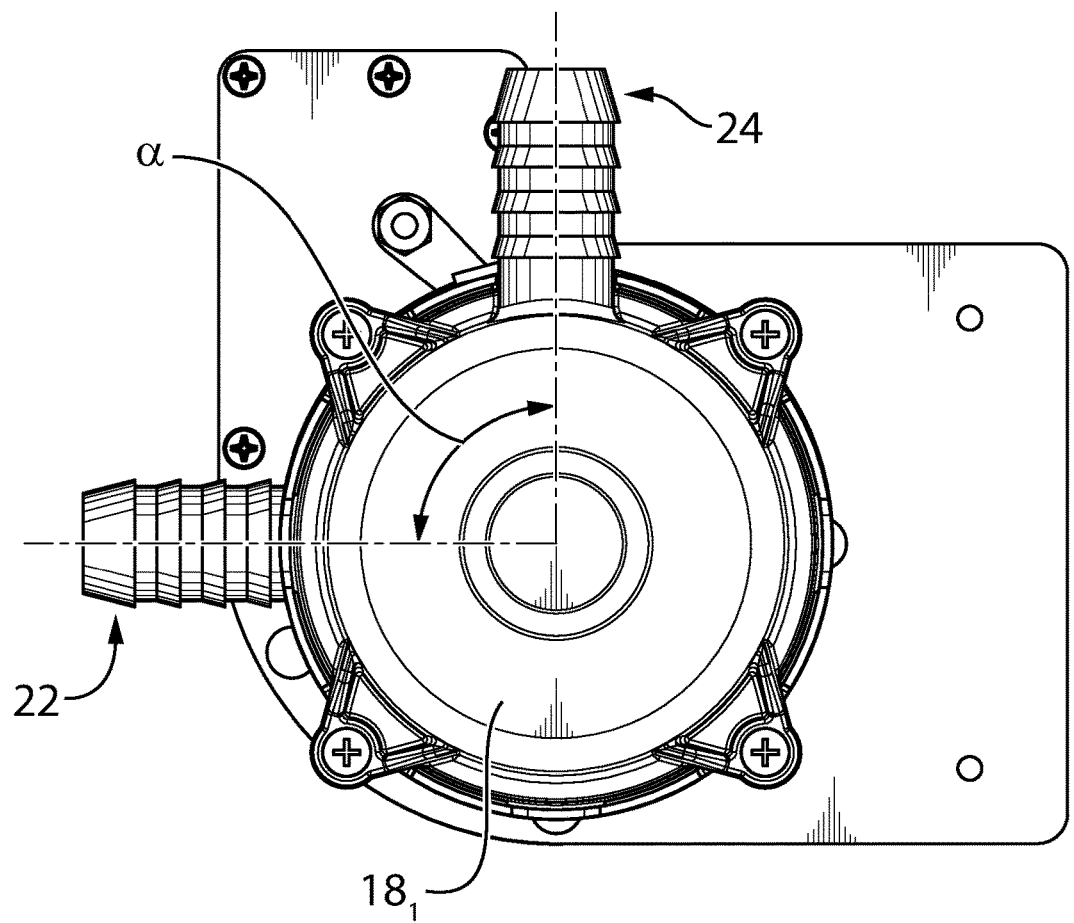

In the specific example shown in the drawings, and as best shown in FIG. 4B, the tubular conduits 60, 78 of the first and second end caps 26, 28, which constitute the water outlet 24 and the water inlet 22 of the reactor unit 12, are oriented in different directions. In other words, the inlet 22 is oriented in a different direction than the outlet 24. More particularly, the inlet 22 is oriented at an angle α measured about the longitudinal axis 16 relative to the outlet 24. In this example of implementation, the angle α has a value of 90°. The angle α may have any other suitable value in other embodiments. For instance, in some cases, the angle α may be at least 30°, in some cases at least 60°, in some cases at least 90°, in some cases at least 120°, in some cases at least 150°, and in some cases even more (e.g., 180°). The different orientations of the inlet 22 and the outlet 24 may facilitate placement of other components of the bathing unit system 100 (e.g., tubing, pumps, etc.) and/or may encourage water circulation within the housing. It is however to be appreciated that while the inlet 22 has been shown to be oriented in a different direction than the outlet 24, in an alternative implementation, the inlet 22 and the outlet 24 may be positioned along a same axis (i.e. the angle α may be essentially 0°).

The reactor unit 12 also comprises a sealing fastener 101 for sealing a passage between the reactor unit 12 and the power unit 14. As shown in FIGS. 13A to 15, the sealing fastener 101 comprises an external thread 102 and a shoulder 104. The external thread 102 of the sealing fastener 101 is configured to engage the internal thread 91 of the opening 90 of the first end cap 26. As such, when the sealing fastener 101 is secured to the first end cap 26, the packing member 94 (best seen in FIG. 5) is disposed between the sealing fastener 101 and the first end cap 26. More specifically, the packing 94 is enclosed between a bottom lip 106 of the sealing fastener 101 and the shoulder 92 of the opening 90 of the first end cap 26. It is noted that the packing member 94 is of a suitable size to create a water tight seal around an outer peripheral surface of the casing 33 of the UV light source 25.

The sealing fastener 101 also comprises an opening 108 that extends through a length of the sealing fastener 101 and an inner step 109 in the opening 108. The step 109 thus forms two distinct peripheral surfaces in the opening 108. Notably, the sealing fastener 101 comprises a first inner peripheral surface 110 and a second inner peripheral surface 111. The first inner peripheral surface 110 is configured to engage the outer peripheral surface of the casing 33 of the UV light source 25 while the second inner peripheral surface 111 is configured to engage the cushioning element 35₁ which is disposed at an end of the UV light bulb 31. To that end, in the present example, a perimeter of the first inner peripheral surface 110 is greater than a perimeter of the second inner peripheral surface 111.

In the specific embodiment depicted, the shoulder 104 of the sealing fastener 101 is configured to be engaged by a conventional tool (e.g., a wrench) in order to facilitate the attaching and removing of the sealing fastener 101. To that end, in this embodiment, the shoulder 104 has a hexagonal shape.

The reactor unit 12 also comprises a fastener cap 112 for maintaining the UV light bulb 31 within the casing 33 and covering the sealing fastener 101. The fastener cap 112 is generally cylindrical in shape and comprises an opening 114 that extends from an inner side to an outer side of the fastener cap 112. The opening 114 allows the UV light bulb 31 to extend through the fastener cap 112. The fastener cap 112 is configured to securely engage the sealing fastener 101. To that end, the fastener cap 112 comprises one or more internal protrusions 116 (e.g., ribs) that may allow the fastener cap 112 to better retain the sealing fastener 101. In particular, the internal protrusions 116 of the fastener cap 112 engage an outer surface of the shoulder 104 of the sealing fastener 101.

In this embodiment, the fastener cap 112 comprises an elastomeric material. For instance, the elastomeric material of the fastener cap 112 may be rubber, silicone or any other suitable elastomeric material.

The reactor unit 12 also comprises a grounding assembly 120 (shown in FIGS. 1 and 2) for grounding the housing 20. The grounding assembly 120 comprises a grounding member 122 that is connected to the housing 20. More specifically, the grounding member 122 is connected to a stud 124 that protrudes from an outer peripheral surface of the housing 20. The grounding assembly 120 also comprises a grounding bracket 126 that extends from the grounding member 122 to a grounded element of the UV treatment system 10. In this example, the grounded element of the UV treatment system 10 consists of a mounting fixture that will be described below. Moreover, in this example, a fastener (e.g., a nut) connects the grounding member 122 and the grounding bracket 126 to the stud 124 of the housing 20. The grounding assembly 120 may thus ground the reactor unit 12 to a ground of the UV treatment system 10 to direct current to ground in the event of a short circuit for example.

The UV treatment system 10 also comprises a mounting fixture 125 (shown in FIG. 5) for mounting the UV treatment system 10 at a suitable location in the bathing unit system 100, such as a bracket or frame located underneath a skirt of the bathing unit. The mounting fixture 125 is disposed between the reactor unit 12 and the power unit 14 and each of the reactor unit 12 and the power unit 14 is secured to the mounting fixture 125. More specifically, in this embodiment, the mounting fixture 125 includes a plate having a plurality of attachment points 127₁-127₄ (e.g., holes) some of which may be used for attaching the mounting fixture 125 at a suitable location in the bathing unit system 100 and others of which may be used for attaching the reactor unit 12 and the power unit 14. For instance, at least some of the attachment points 127₁-127₄ may be aligned with the openings 88 of the second mounts 86₁-86ₘ of the first end cap 26. In a specific implementation the plate may be made of metal, although in alternative implementations plastic may be used. The mounting fixture 125 may also comprise one or more studs 128 that protrude from either side of the mounting fixture 125. For instance, the grounding bracket 126 of the grounding assembly 120 may be connected to the stud 128 of the mounting fixture 125.

In the embodiment depicted, the power unit 14 defines the first end 18₂ of the UV treatment system 10. In this embodiment, the power unit 14 comprises a cover member including a first cover member component 130 and a second cover member component 132 adjacent to the first cover member component 130, a socket 134 housed within the first cover member component 130 and a ballast 136 housed within the second cover member component 132.

The socket 134 (shown in FIG. 18) is configured to connectedly receive the UV light bulb 31 of the UV light source 25. In particular, the socket 134 comprises a connecting arrangement 138 (e.g., a plurality of pin holes) having a pattern that matches the connecting arrangement 45 of the UV light bulb 31 (shown in FIG. 13A). The socket 134 is affixed to the first cover member component 130 of the power unit 14 such as to align the connecting arrangement 138 with that of the UV light bulb 31. As shown in the Figures, the socket 134 is housed within an internal space 140 defined by the first cover member component 130 and the socket 134 is electrically connected to the ballast 136 housed within the second cover member component 132 via a connecting wire 135.

In alternative embodiments, the UV light bulb 31 may be connected directly to the connecting wire 135. For example, in such an embodiment, the UV light bulb 31 may be connected to a wire terminating in a male or female connector and be configured to be mated with an opposing connector of the connecting wire 135.

The ballast 136 is connected to a power source (e.g., an electrical outlet) via a connection cord 142 and is configured to modify an electrical input received from the power source to have a voltage and current suitable for powering the UV light source 25. The ballast 136 is affixed to the second cover member 132 in any suitable way. As described above, the ballast 136 is housed within an internal space 144 defined by the second cover member component 132.

The first and second cover member components 130, 132 of the power unit 14 are configured to be mounted to the mounting fixture 125. More particularly, in this embodiment, the first cover member component 130 is fastened to the mounting fixture 125 via fasteners (e.g., bolts) extending through the mounting fixture 125 and engaging given ones of the mounts $86_1$-$86_M$ of the first end cap 26. Moreover, in this embodiment, the second cover member component 132 is fastened to the mounting fixture 125 via fasteners that engage the mounting fixture 125 and a plurality of fastening elements of the second cover member component 132. A gasket 137 may be disposed between each of the first and second cover members components 130, 132 and the mounting fixture 125.

The first and second cover member components 130, 132 of the power unit 14 are configured to be complementary to one another. For instance, in this embodiment, the first and second cover member components 130, 132 are shaped complementarily to one another. More specifically, the first cover member component 130 comprises a side wall 146 and the second cover member component 132 comprises a side wall 148, where the side walls 146, 148 of the first and second cover member components 130, 132 are adjacent one another. In this embodiment, the side wall 146 of the first cover member component 130 has a shape that matches a shape of the side wall 148 of the second cover member component 132. For instance, in this embodiment, the side wall 146 of the first cover member component 130 defines a curve that matches a curve defined by the side wall 148 of the second cover member component 132. Furthermore, in this example of implementation, the first and second cover member components 130, 132 are positioned such that their respective side walls 146, 148 are in contact with one another.

Figure 18:
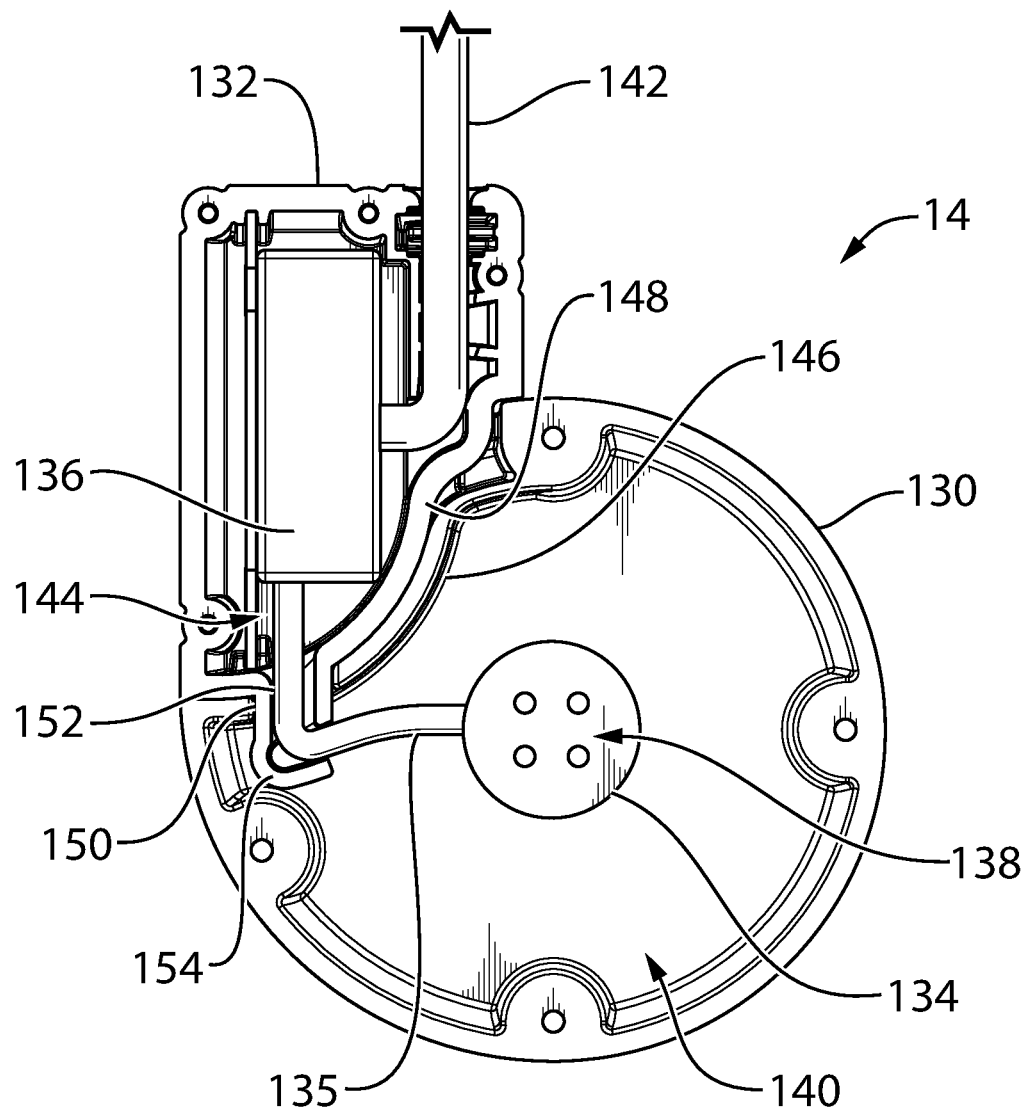
FIG. 18 is a front elevational view of the cover member shown in FIGS. 16 and 17, showing an internal space of each of the first and second cover member components and including a socket and a ballast housed within the cover member, the socket and ballast being housed in respective ones of the first and second cover member components.

Furthermore, in this embodiment, the internal space 140 of the first cover member component 130 and the internal space 144 of the second cover member component 132 are continuous with one another. That is, the internal space 140 of the first cover member component 130 and the internal space 144 of the second cover member component 132 are connected to one another. For example, as best seen in FIG. 18, the first cover member component 130 comprises an opening 150 in its side wall 146, and the second cover member component 132 comprises an opening 152 in its side wall 148 that is aligned with the opening 150 in the side wall 146 of the first cover member component 130. The openings 150, 152 thus allow the internal spaces 140, 144 of the first and second cover member components 130, 132 to be in communication with one another.

Moreover, in this embodiment, a portion 154 of the second cover member component 132 extends into the internal space 140 of the first cover member component 130. For example, the portion 154 of the second cover member component 132 may be a cord guide to guide the connector 135 into the second cover member component 132.

The shape of the side walls 146, 148 of the cover member components 130, 132 and/or the continuity of the internal spaces 140, 144 of the first and second cover member components 130, 132 may assist in reducing a footprint associated with the UV treatment system 10. That is, the UV treatment system 10 may be more compact and thus occupy less space within the bathing unit system 100. In particular, by configuring the UV treatment system 10 so that the reactor and the power unit 14 form an essentially unitary component, a general compact design may be achieved.

Figure 17:
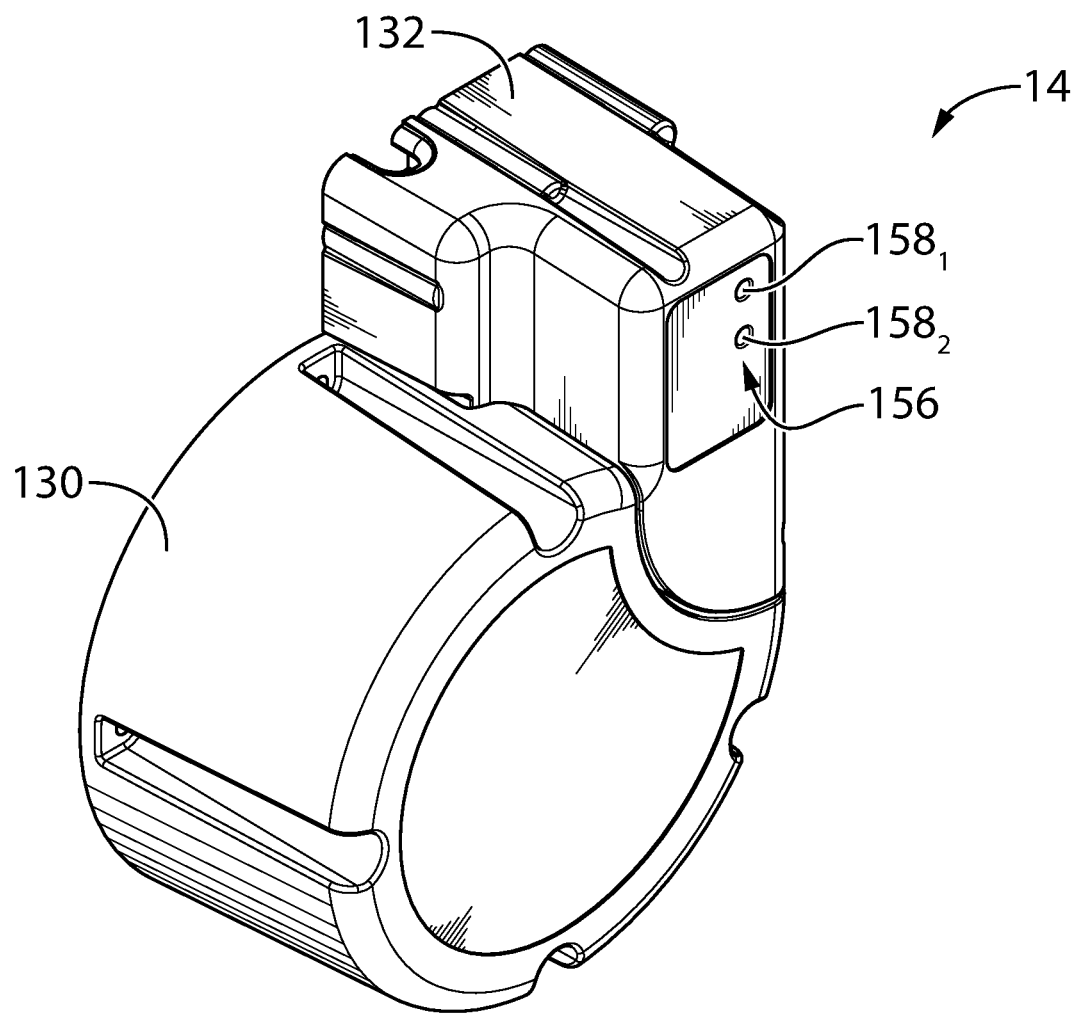

Optionally, the power unit 14 may be configured to provide a status indication of the UV treatment system 10 to the user. For instance, in this embodiment and as depicted in FIG. 17, the power unit 14 comprises a visual status indicator 156 for conveying a status of the UV treatment system 10 to the operator. More specifically, the visual status indicator 156 comprises a plurality of light emitters $158_1$, $158_2$ (e.g., LEDs) that emit light. In this example of implementation, the light emitters $158_1$, $158_2$ are contained within the second cover member component 132 and are visible through openings in the second cover member component 132. Each light emitter $158_i$ may be associated with a particular status of the UV treatment system 10. This may be achieved by attributing the light emitter $158_i$ a distinctive characteristic that the operator may associate with the particular status of the UV treatment system 10. For example, the light emitter $132_i$ may have a particular color (e.g., green, red, etc.) that conveys a particular status of the UV treatment system 10 to the user. The particular status of the UV treatment system 10 may be, for example, a power ON or power OFF status of the UV treatment system 10 (i.e., whether the UV treatment is on or off), an error status of the UV treatment system 10, a maintenance status of the UV treatment system 10 (e.g., signifying that the UV treatment system 10 needs maintenance), or any other status that may be of interest to the user.

The power unit 14 may be configured in other suitable ways in other embodiments.

Figure 19:
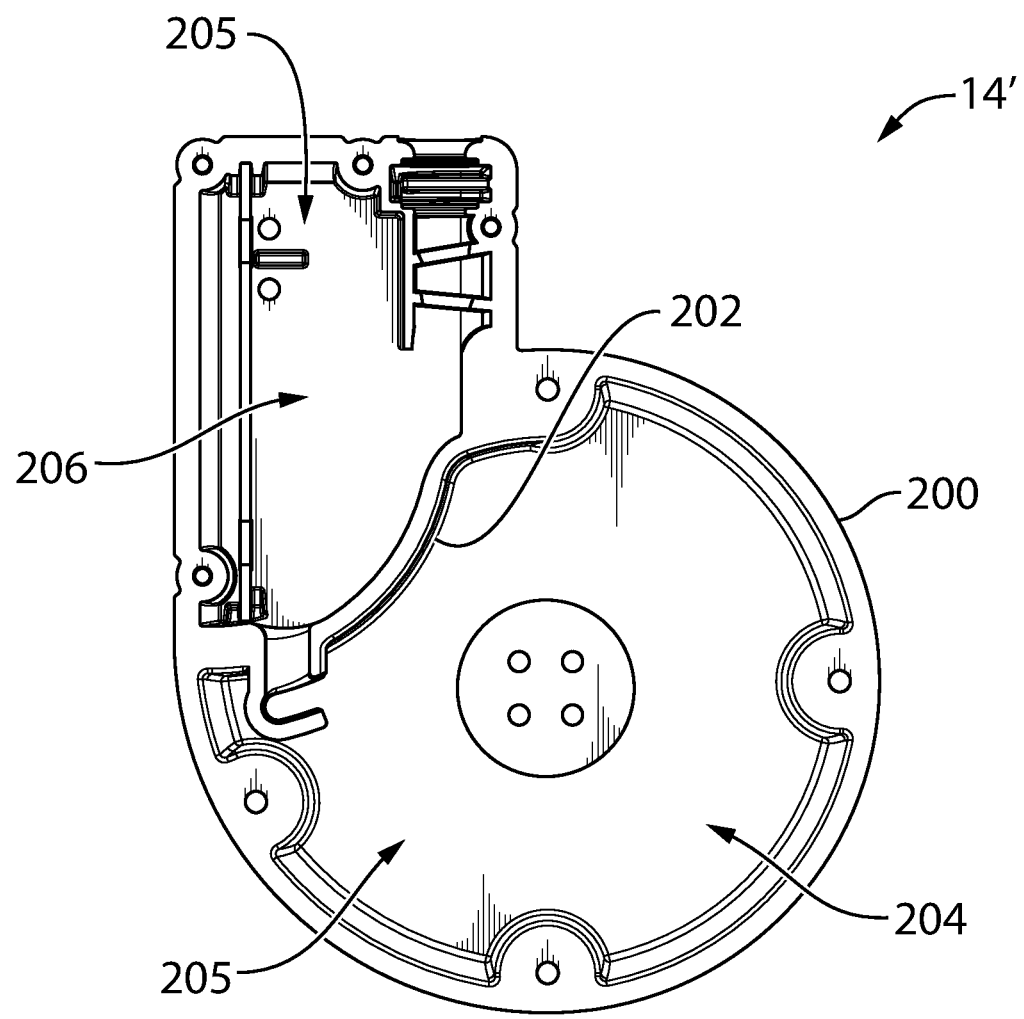
FIG. 19 shows an example of a variant of a cover member of the power unit positioned at the first end of the UV water treatment system of FIG. 1, wherein the cover member is comprised of a unitary body housing the socket and ballast elements.

For instance, in a variant, as shown in FIG. 19, a power unit 14' may comprise a unitary cover member 200 having one or more inner walls 202 that partition an internal space 205 defined by the cover member 200. Thus, the socket 134 may be housed in a first compartment 204 of the cover member 200 and the ballast 136 may be housed in a second compartment 206 of the cover member 200.

Although in this embodiment, the UV treatment system 10 has been described as being designed for use in a spa, the UV treatment system 10 may be used in conjunction with other systems that would benefit from UV treatment. For example, the UV treatment system 10 may be used in conjunction with a swimming pool, a bathtub, a drinking water dispenser unit, a fish pond and in any suitable industrial applications where treated water may be desirable.

Figure 20:
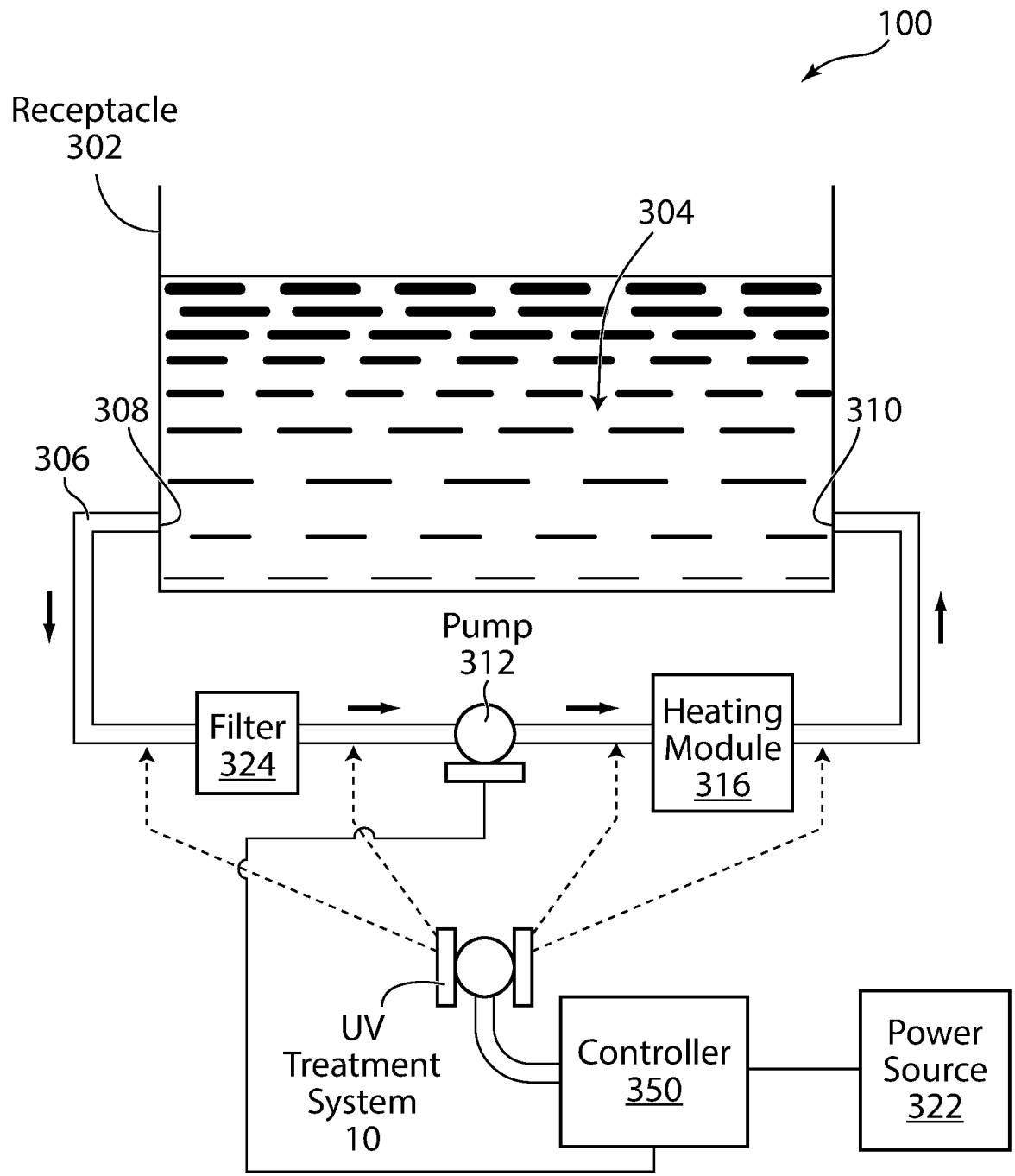
FIG. 20 is a block diagram of a bathing unit in which the UV water treatment system shown in FIG. 1 may be installed.

FIG. 20 illustrates a block diagram of a bathing unit system 100 incorporating the UV treatment system 10 in accordance with a specific example of implementation of the invention. The bathing unit system 100 includes a bathing unit receptacle 302 for holding water 304, water inlets 310 (only one is shown) which will typically be connecting to respective jets, water outlets 308 (only one is shown), and a circulation system 306 including a flow conduit for removing and returning water from and to the receptacle 302 through the water inlets and water outlets. The circulation system 306 depicted is shown as having a single flow conduit for the purpose of simplicity, however, the person skilled in the art will appreciate that practical implementations of the bathing unit system may including multiple flow conduits interconnecting water inlets and water outlets to the receptacle 302. A heating module 316, a water pump 312 and a filter 324 are shown positioned within the circulation system 306. It should be understood that the bathing unit system 10 could include more or fewer bathing unit components which may be positioned in various suitable positions in the circulation system.

A bathing unit controller 350 controls the settings of the components in the bathing unit system 100 including the settings of the heating module 316, the water pump 312 and the filter 324. The controller 350 receives electrical power from an electric power source 322 and controls the distribution of power supplied to the various bathing unit components on the basis of control signals received from various sensors (not shown) in order to cause desired operational settings to be implemented. Manners in which the bathing unit controller 350 may be configured and used to control the bathing unit components for the regulation of the operation of the bathing unit system 100 are known in the art and are not critical to the invention and as such will not be described in further detail here.

The bathing unit system 100 further includes the UV treatment system 10 for sanitizing the water 304 in the receptacle 302. As shown, the UV treatment system 10 is in communication with the controller 350. The controller 350 receives electrical power from an electric power source 322, which may be any suitable power source, and controls the distribution of power supplied to the UV treatment system 10. In a non-limiting example, the power source 322 is a 240 VAC power source. In the specific example depicted in FIG. 20, the controller 350 also receives data related to the circulation pump 312. The data related to the circulation pump 312 may convey, for example, information related to the operational state of the circulation pump 312 (ON/OFF state) and information related to a water pressure within the pump. Optionally, the controller 350 may also be in communication with the controller (not shown) of the bathing unit.

As depicted in FIG. 20, the UV treatment system 10 is configured to be positioned in fluid communication with the circulation system 306 for allowing water from the receptacle 302 to flow through the UV treatment system 10 as it circulates through the circulation system 106 between the water outlet 308 and water inlet 310. As illustrated by the dotted lines in FIG. 20, the UV treatment system 10 may be positioned, for example, upstream or downstream from the pump 312, between the filter 324 and the heating module 316 or downstream from the heating module 316. The tubular conduit 60 of the second end cap 28 and the tubular conduit 78 of the first end cap 26 of the UV treatment system 10 (described with reference to FIGS. 9, 10, 11 and 12) are used to connect the UV treatment system 10 within the circulation system 306 using any suitable fastening mechanism for permitting water flow from the receptacle 302 through the UV treatment system 10 as it circulates through the circulation system 106 between the water outlet 308 and the water inlet 310.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art. Therefore, the scope of the invention should be limited only by the appended claims and their equivalents.

The invention claimed is:

1. An ultraviolet (UV) water treatment system for use in treating water in a spa system, the spa system including a receptacle for holding water and a circulation system for removing and returning water from and to the receptacle, said UV water treatment system being configured to be installed in a space under a spa skirt of the spa system, said UV water treatment system comprising:
a reactor unit configured to be positioned in fluid communication with the circulation system of the spa system for allowing water from the receptacle to flow through the reactor unit as the circulation system removes and returns water from and to the receptacle, the reactor unit comprising:
a tubular housing having a first end portion and a second end portion;
a first end cap disposed at the first end portion of the housing, the first end cap comprising an inlet for receiving water into the housing;
a second end cap disposed at the second end portion of the housing, the second end cap comprising an outlet for expelling water out of the housing;
a UV light source disposed within the housing and configured to radiate UV light into the housing; and
a plurality of fasteners engaging and extending between the first end cap and the second end cap to secure the first end cap and the second end cap to the reactor unit;
a power unit configured to power the UV light source, the power unit comprising an enclosure disposed at the first end portion of the reactor unit, the power unit enclosure holding:
a socket connectedly receiving the UV light source; and
a ballast connected to the socket, the enclosure of the power unit configured to hold the ballast laterally adjacent to the socket within the enclosure;
a mounting fixture disposed at the first end portion of the tubular housing of the reactor unit between the reactor unit and the power unit enclosure, the mounting fixture being configured for facilitating mounting of the UV water treatment system to the spa system.

2. The UV water treatment system of claim 1, wherein the enclosure of the power unit includes a cover member defining a first internal space and a second internal space, said first internal space housing the socket and said second internal space housing the ballast.

3. The UV water treatment system of claim 2, wherein the cover member includes a first cover member component defining the first internal space and a second cover member component defining the second internal space.

4. The UV water treatment system of claim 3, wherein the first cover member component and the second cover member component are configured to be complementary to one another.

5. The UV water treatment system of claim 4, wherein the first and second cover member components are shaped complementarily to one another.

6. The UV water treatment system of claim 5, wherein the first cover member component comprises a first side wall, the second cover member component comprises a second side wall adjacent to the first side wall, the first side wall having a shape that matches a shape of the second side wall.

7. The UV water treatment system of claim 6, wherein the first side wall defines a curve that matches a curve defined by the second side wall.

8. The UV water treatment system of claim 3, wherein the first internal space and the second internal space are continuous with one another.

9. The UV water treatment system of claim 8, wherein the first cover member component comprises a first side wall, the second cover member component comprises a second side wall adjacent to the first side wall, each of the first and second side wall comprising an opening, the opening of the first side wall being aligned with the opening of the second side wall.

10. The UV water treatment system of claim 9, wherein a portion of the second cover member component extends into the first internal space of the first cover member component.

11. The UV water treatment system of claim 1, wherein the power unit comprises a visual status indicator for providing a visual status of the UV water treatment system to an operator.

12. The UV water treatment system of claim 11, wherein the visual status indicator comprises a plurality of light emitters for emitting light, each light emitter being associated with a particular status of the UV treatment system.

13. The UV water treatment system of claim 1, wherein the reactor unit and the power unit are secured to the mounting fixture.

14. The UV water treatment system of claim 13, wherein the mounting fixture includes a mounting plate to which the reactor unit and the power unit are secured.

15. The UV water treatment system of claim 1, wherein the mounting fixture includes attachment points for facilitating mounting of the UV water treatment system in the spa system.

16. The UV water treatment system of claim 1, wherein the enclosure of the power unit comprises a unitary cover member having one or more inner walls that partition an internal space defined by the unitary cover member into a first internal space and a second internal space, said first internal space housing the socket and said second internal space housing the ballast.

17. The UV water treatment system of claim 1, wherein:
the first end cap comprises a plurality of mounts disposed on a peripheral edge of the first end cap;
the second end cap comprises a plurality of mounts disposed on a peripheral edge of the second end cap;
each of the plurality of fasteners engaging and extending between respective pairs of the mounts disposed on the peripheral edges of the first and second end caps.

18. A spa system comprising a receptacle for holding water, a circulation system for removing and returning water from and to the receptacle, and an ultraviolet (UV) water treatment system for treating water in the spa system, said UV water treatment system being configured to be installed in a space under a spa skirt of the spa system, said UV water treatment system comprising:
a reactor unit configured to be positioned in fluid communication with the circulation system for allowing water from the receptacle to flow through the reactor unit as the circulation system removes and returns water from and to the receptacle, the reactor unit comprising:
a tubular housing having a first end portion and a second end portion;
a first end cap disposed at the first end portion of the housing, the first end cap comprising an inlet for receiving water into the housing;
a second end cap disposed at the second end portion of the housing, the second end cap comprising an outlet for expelling water out of the housing;
a UV light source disposed within the housing and configured to radiate UV light into the housing; and
a plurality of fasteners engaging and extending between the first end cap and the second end cap to secure the first end cap and the second end cap to the reactor unit;
a power unit configured to power the UV light source, the power unit comprising an enclosure disposed at the first end portion of the reactor unit, the power unit enclosure holding:
a socket connectedly receiving the UV light source; and
a ballast connected to the socket, the enclosure of the power unit configured to hold the ballast laterally adjacent to the socket within the enclosure;
a mounting fixture disposed at the first end portion of the tubular housing of the reactor unit between the reactor unit and the power unit enclosure, the mounting fixture being configured for facilitating mounting of the UV water treatment system to the spa system.

19. The spa system of claim 18, wherein:
the first end cap comprises a plurality of mounts disposed on a peripheral edge of the first end cap;
the second end cap comprises a plurality of mounts disposed on a peripheral edge of the second end cap;
each of the plurality of fasteners engaging and extending between respective pairs of the mounts disposed on the peripheral edges of the first and second end caps.

20. An ultraviolet (UV) water treatment system for use in treating water in a spa system, the spa system including a receptacle for holding water and a circulation system for removing and returning water from and to the receptacle, the UV water treatment system being configured to be installed in a space under a spa skirt of the spa system, said UV water treatment system comprising:
a mounting fixture including a first side and a second side opposed to the first side, wherein the mounting fixture is configured for facilitating mounting of the UV water treatment system to the spa system;
a power unit comprising an enclosure holding a socket and a ballast connected to the socket, said enclosure being secured to the first side of said mounting fixture and being configured to hold the ballast laterally adjacent to the socket within the enclosure; and
a reactor unit secured to the second side of said mounting fixture, said reactor unit being configured to be positioned in fluid communication with the circulation system of the spa system to receive and treat water as the circulation system removes and returns water from and to the receptacle, the reactor unit comprising:
  a housing comprising a first end portion and a second end portion;
  a first end cap disposed at the first end portion of the housing, the first end cap comprising an inlet for receiving water into the reactor unit;
  a second end cap disposed at the second end portion of the housing, the second end cap comprising an outlet for expelling water out of the reactor unit;
  a UV light source disposed within the housing and engaging the socket of the power unit to receive electrical power, the UV light source being configured to radiate UV light into the housing; and
  a plurality of fasteners engaging and extending between the first end cap and the second end cap to secure the first end cap and the second end cap to the reactor unit.

21. The UV water treatment system of claim 20, wherein at least a portion of each of the first end cap and the second end cap comprises plastic material.

22. The UV water treatment system of claim 21, wherein the reactor unit comprises first and second mounting members disposed at the first and second end portions of the housing.

23. The UV water treatment system of claim 22, wherein the first end cap sealingly engages the first mounting member and the second end cap sealingly engages the second mounting member.

24. The UV water treatment system of claim 23, wherein the first end cap includes a packing member disposed to interface with the first end portion of the housing, and the second end cap includes another packing member disposed to interface with the second end portion of the housing.

25. The UV water treatment system of claim 20, wherein the inlet and the outlet are oriented in different directions.

26. The UV water treatment system of claim 20, wherein the first end cap comprises:
  a first tubular conduit protruding from a peripheral edge of the first end cap, the first tubular conduit defining an opening of the inlet for receiving water into the reactor unit; and
  a curved inner wall protruding from an inner peripheral surface of the first end cap and extending below a lower end of the opening of the first tubular conduit to shield the opening of the first tubular conduit from UV light radiated by the UV light source.

27. The UV water treatment system of claim 20, wherein the enclosure of the power unit comprises a unitary cover member having one or more inner walls that partition an internal space defined by the unitary cover member into a first internal space and a second internal space, said first internal space housing the socket and said second internal space housing the ballast.

28. The UV water treatment system of claim 20, wherein:
  the first end cap comprises a plurality of mounts disposed on a peripheral edge of the first end cap;
  the second end cap comprises a plurality of mounts disposed on a peripheral edge of the second end cap;
  each of the plurality of fasteners engaging and extending between respective pairs of the mounts disposed on the peripheral edges of the first and second end caps.

29. A spa system comprising a receptacle for holding water, a circulation system for removing and returning water from and to the receptacle, and an ultraviolet (UV) water treatment system for treating water in the spa system, the UV water treatment system being configured to be installed in a space under a spa skirt of the spa system, said UV water treatment system comprising:
  a mounting fixture including a first side and a second side opposed to the first side, wherein the mounting fixture is configured for facilitating mounting of the UV water treatment system to the spa system;
  a power unit comprising an enclosure holding a socket and a ballast connected to the socket, said enclosure being secured to the first side of said mounting fixture and being configured to hold the ballast laterally adjacent to the socket within the enclosure; and
  a reactor unit secured to the second side of said mounting fixture, said reactor unit being configured to be positioned in fluid communication with the circulation system of the spa system to receive and treat water as the circulation system removes and returns water from and to the receptacle, the reactor unit comprising:
    a housing comprising a first end portion and a second end portion;
    a first end cap disposed at the first end portion of the housing, the first end cap comprising an inlet for receiving water into the reactor unit;
    a second end cap disposed at the second end portion of the housing, the second end cap comprising an outlet for expelling water out of the reactor unit;
    a UV light source disposed within the housing and engaging the socket of the power unit to receive electrical power, the UV light source being configured to radiate UV light into the housing; and
    a plurality of fasteners engaging and extending between the first end cap and the second end cap to secure the first end cap and the second end cap to the reactor unit.

30. The spa system of claim 29, wherein:
  the first end cap comprises a plurality of mounts disposed on a peripheral edge of the first end cap;
  the second end cap comprises a plurality of mounts disposed on a peripheral edge of the second end cap;
  each of the plurality of fasteners engaging and extending between respective pairs of the mounts disposed on the peripheral edges of the first and second end caps.

31. An ultraviolet (UV) water treatment system for use in treating water in a spa system, the spa system including a receptacle for holding water and a circulation system for removing and returning water from and to the receptacle, the UV water treatment system being configured to be installed in a space under a spa skirt of the spa system, said UV water treatment system comprising:
  a power unit; and
  a reactor unit connected to said power unit, said reactor unit being configured to be positioned in fluid communication with the circulation system of the spa system to receive and treat water as the circulation system removes and returns water from and to the receptacle, the reactor unit comprising:
    a housing comprising a first end portion and a second end portion;
    a UV light source disposed within the housing and powered by the power unit, the UV light source being configured to radiate UV light into the housing;
    a first end cap disposed at the first end portion of the housing, the first end cap comprising a first tubular conduit protruding from a peripheral edge of the first end cap, the first tubular conduit defining a first opening into the reactor unit, wherein the first end cap further comprises an inner wall extending below the opening defined by the first tubular conduit to at least partially shield the opening defined by the first tubular conduit from the UV light radiated by the UV light source;

a second end cap disposed at the second end portion of the housing, the second end cap comprising a second tubular conduit defining a second opening into the reactor unit; and a plurality of fasteners engaging and extending between the first end cap and the second end cap to secure the first end cap and the second end cap to the reactor unit.

32. The UV water treatment system of claim 31, further comprising a mounting fixture including a first side and a second side opposed to the first side, wherein the mounting fixture is configured for facilitating mounting of the UV water treatment system to the spa system, wherein:

said power unit is secured to the first side of said mounting fixture; and said reactor unit is secured to the second side of said mounting fixture.

33. The UV water treatment system of claim 31, wherein the first opening defined by the first tubular conduit is for receiving water into the reactor unit, and the second opening defined by the second tubular conduit is for expelling water out of the reactor unit.

34. The UV water treatment system of claim 31, wherein the inner wall protrudes from an inner peripheral surface of the first end cap.

35. The UV water treatment system of claim 31, wherein the second tubular conduit protrudes from a peripheral side of the second end cap.

36. The UV water treatment system of claim 35, wherein the first and second tubular conduits are oriented in different directions.

37. The UV water treatment system of claim 31, wherein at least a portion of each of the first end cap and the second end cap are comprised of plastic material.

38. The UV water treatment system of claim 37, wherein the reactor unit comprises first and second mounting members disposed at the first and second end portions of the housing.

39. The UV water treatment system of claim 38, wherein the first end cap sealingly engages the first mounting member and the second end cap sealingly engages the second mounting member.

40. The UV water treatment system of claim 39, wherein the first end cap includes a packing member disposed to interface with the first end portion of the housing, and the second end cap includes another packing member disposed to interface with the second end portion of the housing.

41. The UV water treatment system of claim 31, wherein:
the first end cap comprises a plurality of mounts disposed on the peripheral edge of the first end cap;
the second end cap comprises a plurality of mounts disposed on a peripheral edge of the second end cap;
each of the plurality of fasteners engaging and extending between respective pairs of the mounts disposed on the peripheral edges of the first and second end caps.

42. A spa system comprising a receptacle for holding water, a circulation system for removing and returning water from and to the receptacle, and an ultraviolet (UV) water treatment system for treating water in the spa system, the UV water treatment system being configured to be installed in a space under a spa skirt of the spa system, said UV water treatment system comprising:

a power unit; and a reactor unit connected to said power unit, said reactor unit being configured to be positioned in fluid communication with the circulation system to receive and treat water as the circulation system removes and returns water from and to the receptacle, the reactor unit comprising:

a housing comprising a first end portion and a second end portion;

a UV light source disposed within the housing and powered by the power unit, the UV light source being configured to radiate UV light into the housing;

a first end cap disposed at the first end portion of the housing, the first end cap comprising a first tubular conduit protruding from a peripheral edge of the first end cap, the first tubular conduit defining a first opening into the reactor unit, wherein the first end cap further comprises an inner wall extending below the opening defined by the first tubular conduit to at least partially shield the opening defined by the first tubular conduit from the UV light radiated by the UV light source;

a second end cap disposed at the second end portion of the housing, the second end cap comprising a second tubular conduit defining a second opening into the reactor unit; and a plurality of fasteners engaging and extending between the first end cap and the second end cap to secure the first end cap and the second end cap to the reactor unit.

43. The spa system of claim 42, wherein:
the first end cap comprises a plurality of mounts disposed on the peripheral edge of the first end cap;
the second end cap comprises a plurality of mounts disposed on a peripheral edge of the second end cap;
each of the plurality of fasteners engaging and extending between respective pairs of the mounts disposed on the peripheral edges of the first and second end caps.

* * * * *